INVENTORS
WALTER ALLEN HELBIG &
WALTER LEE ROSS
BY
ATTORNEY

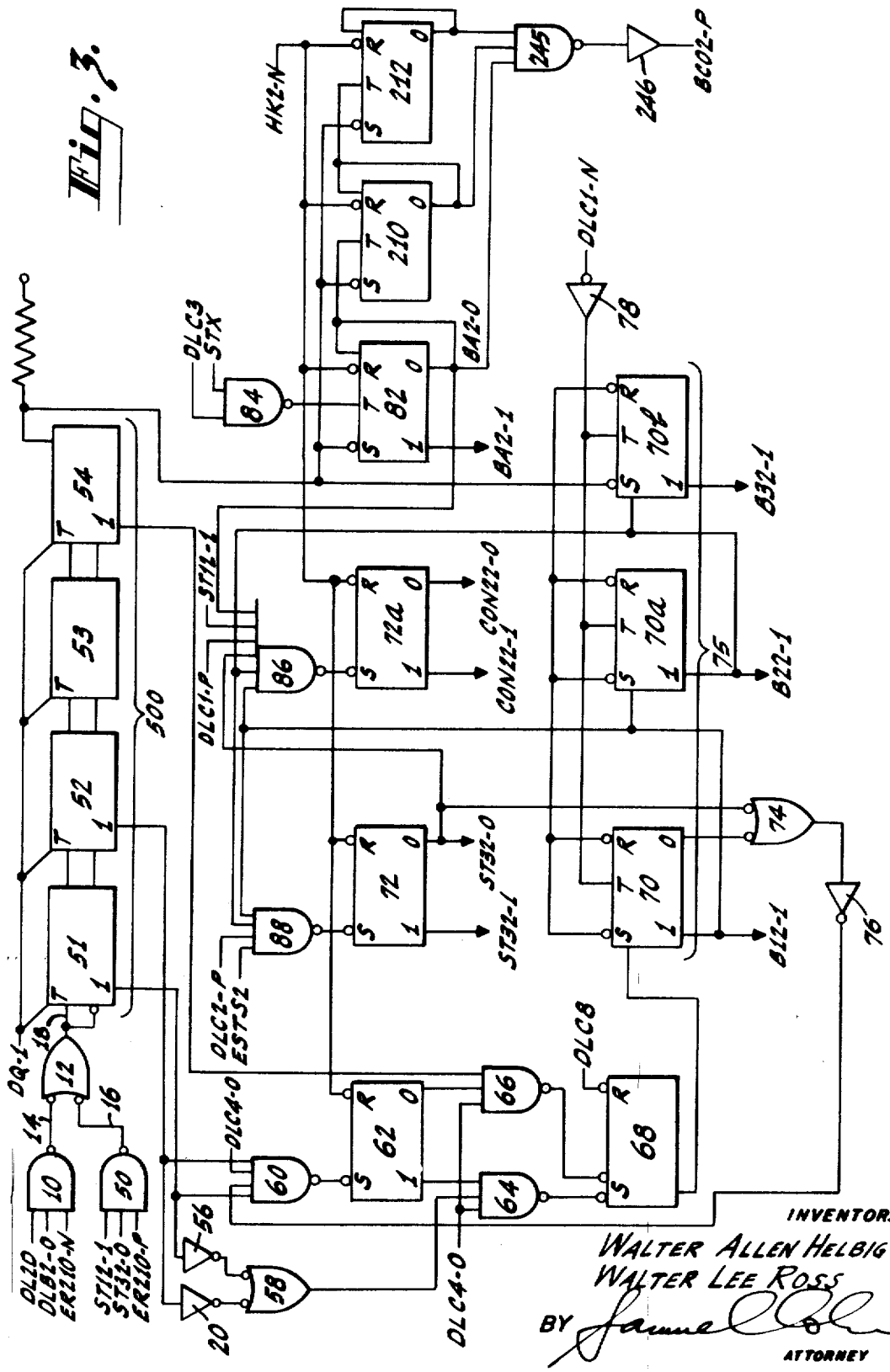

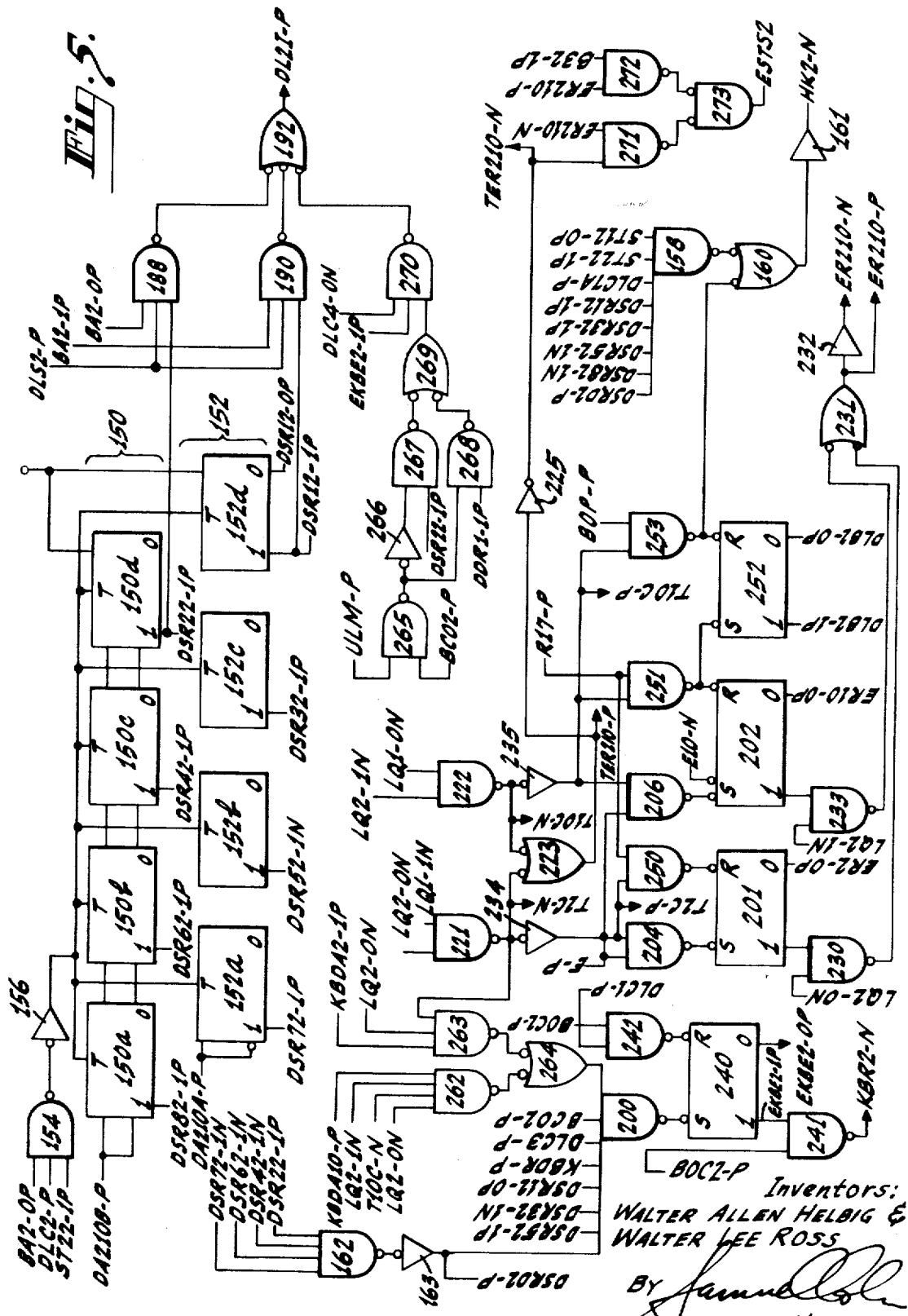

INVENTORS,
WALTER ALLEN HELBIG &
WALTER LEE ROSS

INVENTORS
WALTER ALLEN HELBIG &
WALTER LEE ROSS

ATTORNEY

United States Patent Office 3,555,520
Patented Jan. 12, 1971

3,555,520
MULTIPLE CHANNEL DISPLAY SYSTEM
Walter Allen Helbig, Woodland Hills, and Walter Lee Ross, Simi, Calif., assignors to RCA Corporation, a corporation of Delaware
Filed Apr. 30, 1969, Ser. No. 820,553
Int. Cl. G06f 3/14, 13/02
U.S. Cl. 340—172.5      6 Claims

ABSTRACT OF THE DISCLOSURE

A plurality of memories, each storing character codes for one or more television type displays and a plurality of character generators, each for producing the video signals for one television horizontal scan line. (A plurality of adjacent scan lines form one row on a display.) The character codes are extracted from the memories a group at a time in interlaced fashion. Each group of codes corresponds to one row of characters to be written on one display. Each group of codes is applied to the character generators in succession and each character generator, during successive horizontal scan line intervals, applies successive groups of video signals, each group indicative of the same line on a different display, to the different displays.

BACKGROUND OF THE INVENTION

In a display system which includes a cathode ray tube without storage properties for, for example, displaying letters, numbers, symbols, and the like supplied by a source such as a digital computer, a memory must be employed for "refreshing" the display. The memory continuously supplies the information to the display system in a repetitive manner to cause the visual image cyclically to be recreated.

If in a system of the above type, the display can be made to operate at any frequency desired, the memory can run at its own speed, in asynchronous fashion, and the circuits in the display which generate the sweep and other timing waveforms readily can be made to follow the operation of the memory. In such a system, a relatively inexpensive recirculating memory such as a delay line may be employed or a more expensive, non-recirculating memory such as a core memory, a semiconductor memory or other memory may be used instead. However, asynchronous display systems are not readily available and if they were, they would be expensive.

If the circuits of a display are synchronous to some external frequency source, such as is the case in a conventional television receiver where the sweep and other timing waveforms are all derived from the power line frequency, then the problem of what type of memory to use becomes more serious. An ordinary (inexpensive) recirculating memory such as a delay line does not appear to be practical, as the delay it introduces readily can and usually does change from field-to-field and frame-to-frame. This, at best, causes flicker and, at worst, renders the display of information unintelligible. For this reason, the known systems of this type employ either a core memory (which is relatively expensive) or a very accurate (and expensive) delay line which introduces an amount of delay to the signal it is storing which is synchronous with the operating frequencies of the display, and which remains fixed regardless of variations in temperature or other parameters.

Cost, of course, is an important factor in many aspects of the computer business. In many large systems which employ large numbers of display "terminals" such as computer-controlled instructional systems, time-shared computer systems, and other similar systems, the cost of the system could be reduced substantially if the cost of the individual terminals could be reduced. The object of the present invention is to provide an improved system of this type which employs mass produced and therefore relatively inexpensive display means and relatively inexpensive refresh memories.

SUMMARY OF THE INVENTION

The system of the invention includes a plurality of display means, each having a screen, means for scanning the screen in a raster fashion, and means responsive to display signals which occur during the scanning for displaying said signals on said screen. There are also a plurality of memories, each for one or more display means, and each for storing character codes indicative of the successive characters it is desired to display on its display means. The system also includes a plurality of character generators, each for generating, in response to a character code, the display signals for one line of the row which will display that character, each such generator providing the signals for a different line. The character codes produced by the memories are applied in succession to the successive character generators for causing each generator to provide successive groups of display signals, each group for the same line of a different display means. The successive groups of display signals produced by each character generator are applied to the respective display means for which they are intended during successive time intervals to cause each display means to display the signals for the succeeding lines of a row.

BRIEF DESCRIPTION OF THE DRAWING

FIGS. 3, 4a, 4b and 5 are more detailed block diagrams of the synchronizing circuits and other circuits of FIG. 1;

DETAILED DESCRIPTION CONVENTIONS

Figure 1:
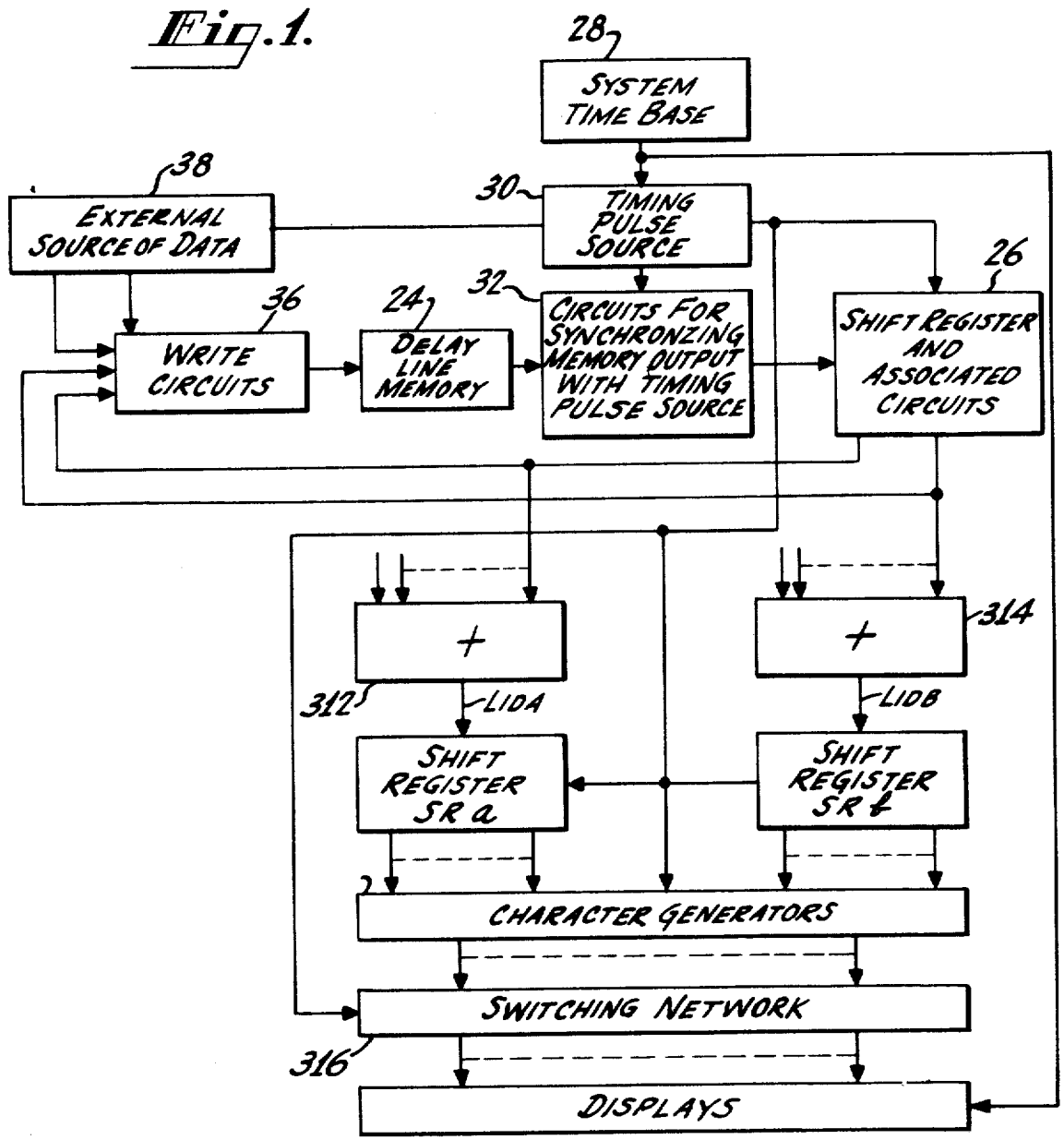
FIG. 1 is a block diagram of one portion of the system of the invention.

In the system of the invention, electrical signals indicative of binary digits (bits) are applied to and obtained from various of the logic gates or other circuit elements. For the sake of brevity in the discussion which follows, the bits themselves are sometimes referred to rather than the signals manifesting the bits. These signals are sometimes identified by a group of letters or numbers. For example, in FIG. 3, DL2D at the upper left identifies a signal which represents a binary digit and which, in fact, is the data signal received from the delay line memory.

Sometimes a group of letters is followed by a dash, followed by a P or an N. The letter P means that when the signal represents the binary digit 1, it is positive and the letter N means that when the signal represents the binary digit 1, it is negative. Where the meaning is clear, the P or the N may be omitted.

The logic gates may be considered to be AND gates and OR gates. The gates with the rounded ends such as gate 10 at the upper left of FIG. 3, are AND gates. The circle which is present at the rounded, that is, the output end of the gate means that the signal produced is relatively negative when it represents the bit 1. For a gate such as 10 when there are three relatively positive signals present at the input, a relatively negative signal is produced at the output. At other times, a relatively positive level is present at the output.

A gate with a pointed end such as 12 in FIG. 3 can be considered to be an OR gate. Here, the two circles at the input to the gate mean that a signal representing a 1, when it is present, is relatively negative. The absence of a circle at the output of gate 12 means that a signal representing a 1, when it is present, is relatively positive. Thus in the operation of gate 12, when either of its two inputs represent a 1, that is, when the signal on lead 14 or the signal on lead 16 is relatively negative, then the output signal at lead 18 is relatively positive. At other times, the output level of gate 12 is relatively negative.

The triangles in the figures represent amplifiers which may perform a signal polarity inversion function. For example, the circuit element 20 at the upper left of FIG. 3, when it receives a relatively positive signal produces a relatively negative signal at its output. However, in logical terms, a relatively positive signal at the input to this particular inverter represents a 1 and a relatively negative signal at the output of the inverter also represents a 1.

The rectangles in the figures which are identified only by a number or a number and a letter, within the rectangle represent flip-flops. The letters S and R represent the set and reset terminals of the flip-flops and letter T represents the trigger terminal of a triggerable flip-flop. The numbers 1 and 0 represent the two outputs produced by a flip-flop, one complementary to the other. In general, when a flip-flop is set, a signal representing a 1 appears at its 1 output terminal and a signal representing 0 appears at its 0 output terminal and when the flip-flop is reset, a signal representing a 1 appears at its 0 output terminal and a signal representing a 0 at its 1 output terminal.

In some cases, the line defining the input side of a gate is extended beyond the boundaries of the gate. The signal applied to this extension of the gate can be thought of as being applied directly to the gate. (See, for example, gate 22 at the lower left part of FIG. 4a, which gate receives four signals.)

FIG. 10

Figure 10:
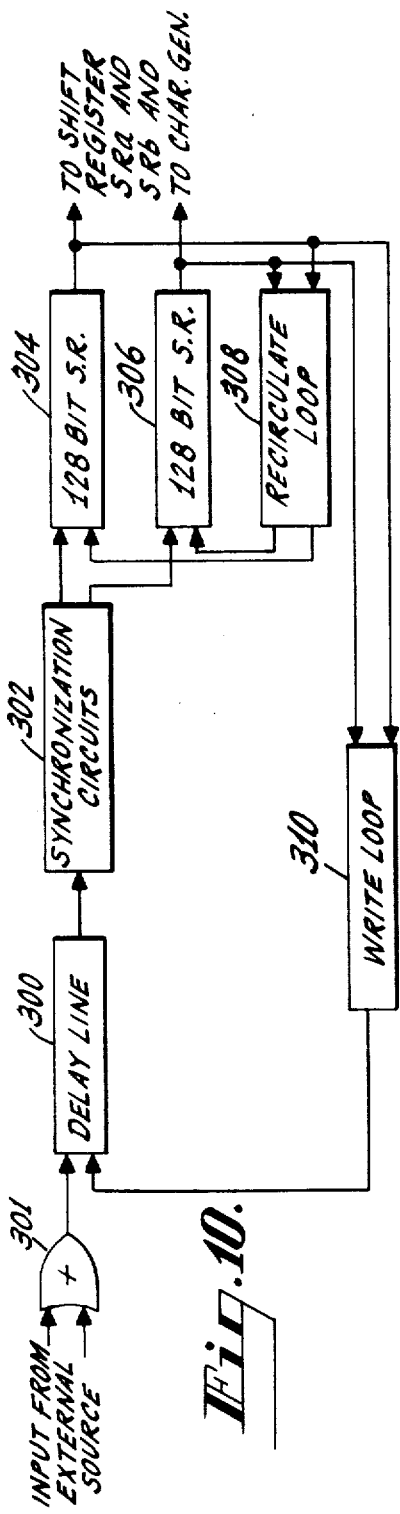
FIG. 10 is a block diagram of a memory employed in the system of the invention.

The memory shown in FIG. 10 is a portion of the system of the present application. The details of this memory are given at the end of the application. However, a brief description of the operation is necessary at this point to see how it fits into the system.

The delay line 300 which initially may be loaded through OR gate 301 from one of a number of external sources such as a keyboard, data processing machine or the like, stores information sufficient for refreshing two television receivers. This information is stored as 8 bit codes such as ASC II codes, where each 8 bit represents one character such as a letter, number, punctuation mark or the like. Thirty-three such codes (thirty-two defining characters and one, a "Bell" code for synchronization purposes) represent one row of characters for one television receiver. There are sixteen groups of such characters, representing sixteen rows for each display so that the delay line stores a total of (16×33)2=1056 characters.

Each group of 33 characters is stored in a delay line length equal to approximately 5½ television scan line intervals (where each such interval has a duration of 63.5 microseconds). However, when converted to video information, these characters are displayed in a row which consists of fourteen television scan lines for each field.

As explained at the latter part of the present application, the delay line 300 is a relatively inexpensive delay line and the characters stored are subject to drift. The purpose of the synchronization circuits 302 which are discussed at length later is to synchronize the bits of each character with an external frequency source.

The synchronized bits are applied to two 128 bit shift registers 304 and 306, that is, alternate bits such as the first, third, fifth and so on go to one of the shift registers and the remaining bits such as the second, fourth, sixth, eighth and so on go to the other shift register. These two shift registers are employed for purposes of convenience to permit the use of commercially available units. (A single 256 bit shift register operative at higher speed—about 6 megahertz (mhz. may be used instead.) The successive bits of the characters are clocked into the register as explained in detail at the latter portion of this application.

Within 5½ scan lines, the bits of one row of characters are stored in the two registers 304 and 306. The bits remain there for an additional half scan line interval and then are recirculated by a recirculated loop 308. The recirculation is performed relatively rapidly—within one scan line interval. During the scan line interval, the bits are applied to shift registers SRa and SRb (FIG. 11) and to a character generator as is discussed shortly.

After the recirculation discussed above, the bits are clocked out of the shift registers 304 and 306 at a slower rate and applied via the write loop 310 to the delay line 300. The time required to return the bits to the delay line is about 5½ scan lines and this time starts at some fixed reference relative to the horizontal synchronization pulses of the television receivers (shown and discussed briefly later).

Figure 2:
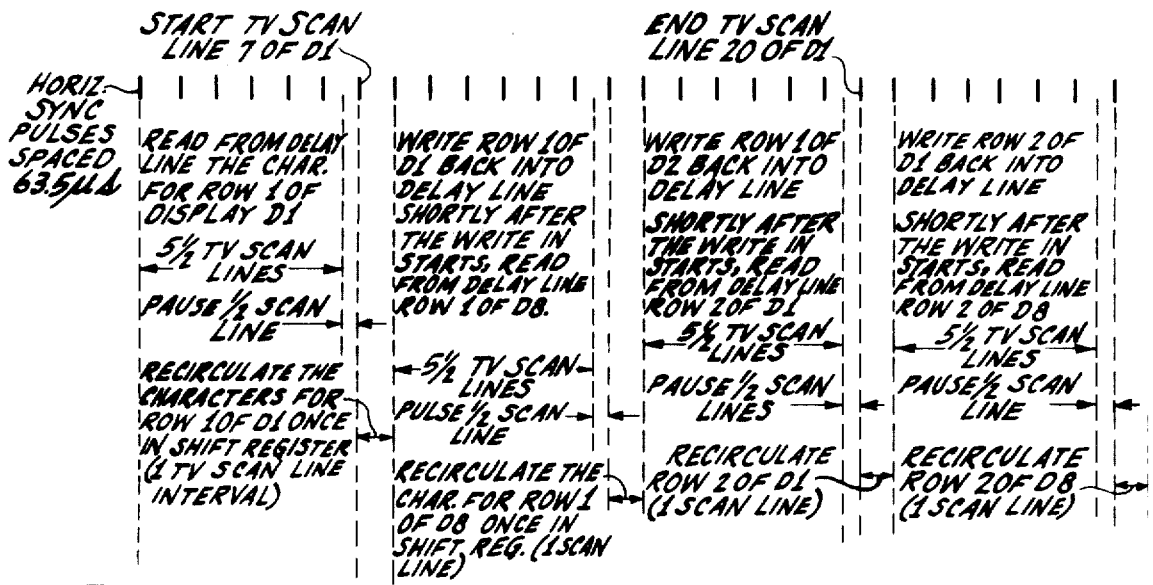
FIG. 2 is a drawing to explain the timing relationship among various operations carried out in the system of FIG. 1.

The operation above is depicted in FIG. 2, the horizontal synchronization pulses spaced 63.5 microseconds apart are shown at the upper part of the figure. It is arbitrarily assumed that the information starts coming from the delay line at television scan line 1 of display D1 (the displays, which are television receivers, are discussed later). The half scan line pause is shown to occur between scan line 6 and 7. The recirculation of the characters in the shift registers 304 and 306 occurs in the interval of scan line 7. At the start of scan line 8, the information starts shifting from the shift registers through the write loop 310 back into the delay line 300. At this same time, the characters for row 1 of the television display D8 are shifted into the shift registers 304 and 306, all as shown in FIG. 2.

FIG. 11

Figure 11:
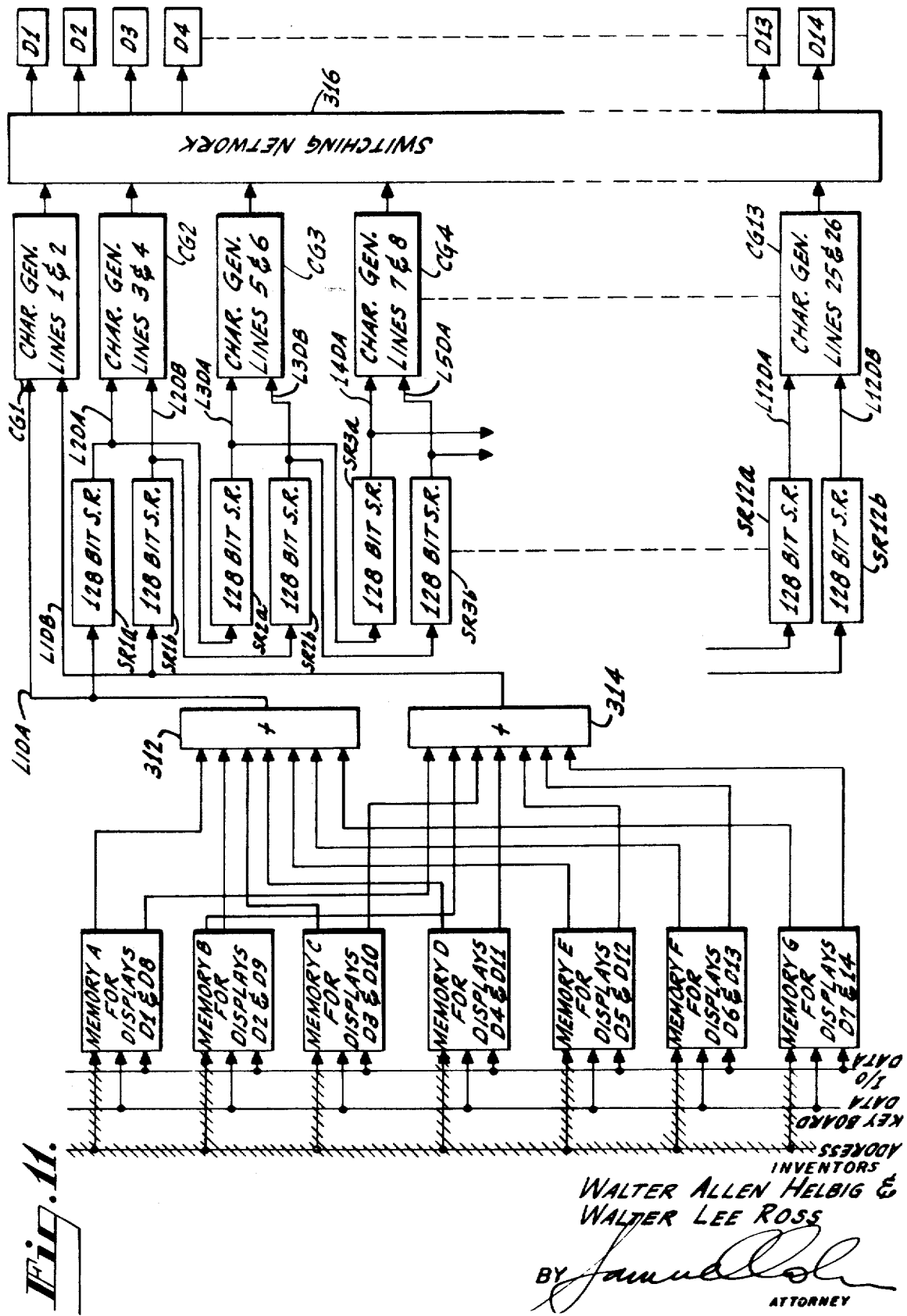
FIG. 11 is a block diagram of the system of the invention.

FIG. 11 shows the major blocks of the system of the present invention. In the practical embodiment illustrated, there are 7 memories such as the memory of FIG. 10. They are legended memory A, memory B . . . memory G. Memory A contains the refresh information for displays D1 and D8; memory B stores the refresh information for displays D2 and D9; memory C stores the refresh information for displays D3 and D10 and so on.

The outputs of the memories A through G are applied through a pair of OR gates 312 and 314 to a group of 12 pairs of shift registers. (As mentioned previously, the use of pairs of registers handling two bits in parallel rather than single registers handling the same two bits serially is due to limitations in the operation speed of the registers.) The shift registers a of each pair are connected in series and the shift registers b of each pair are connected in series. Thus, shift register SR1a feeds into shift register SR2a which in turn feeds into shift register SR3a and so on. The shift registers supply their outputs to 13 character generators CG1, CG2 . . . CG13, only five of which are shown in the figure.

As will be explained in more detail shortly, each character generator generates the video information for two specific television lines. Thus, character generator CG1, during one field of a television frame, generates the video information for line 1 of a row of characters on the television screen and during the next field of the same television frame generates the information for line 2 of the row of characters. This character generator and all of the others are time shared by all of the displays. For example, during one interval of time (63.5 microseconds), character generator CG1 may write the video signals for line 1 of row 5 on display D1; during the next 63.5 μS. interval of time it will write the video signals for line 1 of row 5 for display D2 and so on. Of course, the information the character generator such as CG1 writes on line 1, for example, of row 5 on display D1 may be and generally is different from that it writes on line 1 of row 5 of display D2 and so on. As the output of each character generator must be switched from display to display, a switching network such as 316 is necessary. The output of this network goes to the 14 television displays D1 through D14 of the system.

Figure 12:
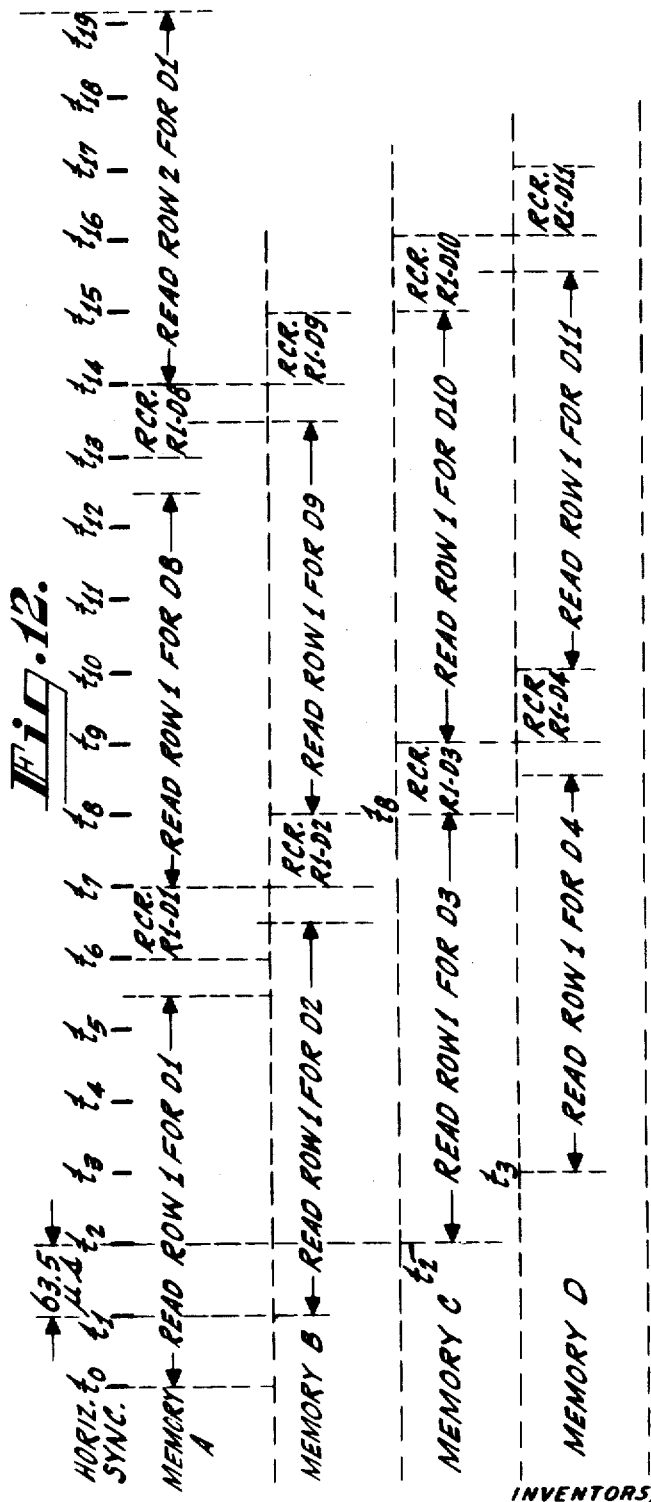
FIGS. 12 and 13 are timing diagrams to help explain the operation of the system of the invention.
Figure 13:
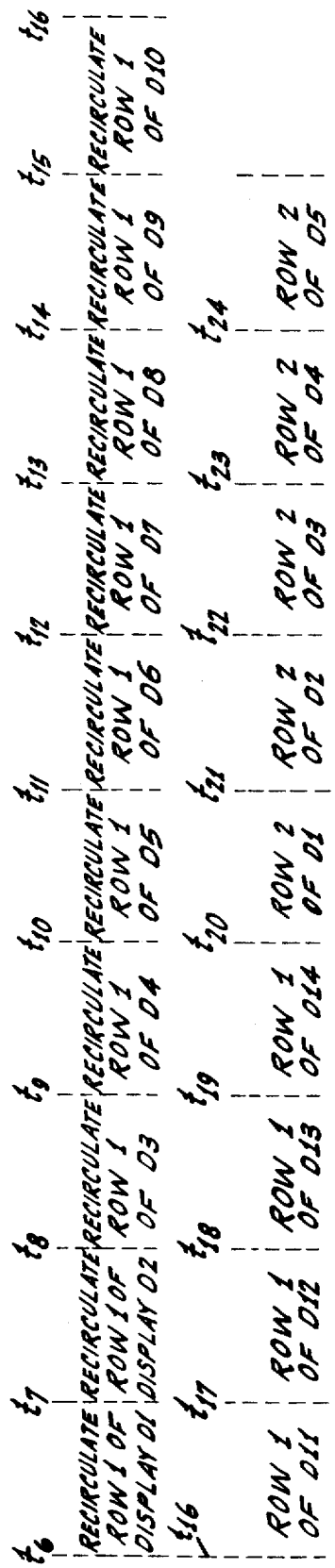

The operation of the system of FIG. 11 may be better understood by referring to FIGS. 10, 12 and 13. As already mentioned, in each memory during 5½ television line times, information is read from the delay line 300 into shift registers 304 and 306. After a pause of a half a television line time, this information is recirculated through the shift registers via recirculation loop 308. This recirculation requires only one line time shown as that of line 6 in FIG.12.

One line time after the memory A starts being read out, memory B starts being read out. The information stored in the two shift registers 304 and 306 of memory B is recirculated during the period of television scan line 7 (interval $t_7-t_8$). In a similar manner, during successive line times the information from successive memories C, D, E and so on are circulated.

All of the above is also shown in FIG. 13. It is to be appreciated, of course, that the horizontal synchronization pulses $t_6$, $t_7$ and so on are those of one particular display such as display D1. As will be explained shortly, line 6 of the display D1 may correspond to some other line in display D4 and so on to permit the rows of the various displays to appear in roughly the same position on each display.

During the period of scan line 6, the information from memory A is transferred through OR gates 312 and 314 to shift registers SR1A and SR1B. This same information L1DA, L1DB is applied directly to character generator CG1. This information consists of the 32 character codes which define the 32 characters to be written in the first field of row 1 on display D1.

Figure 15:
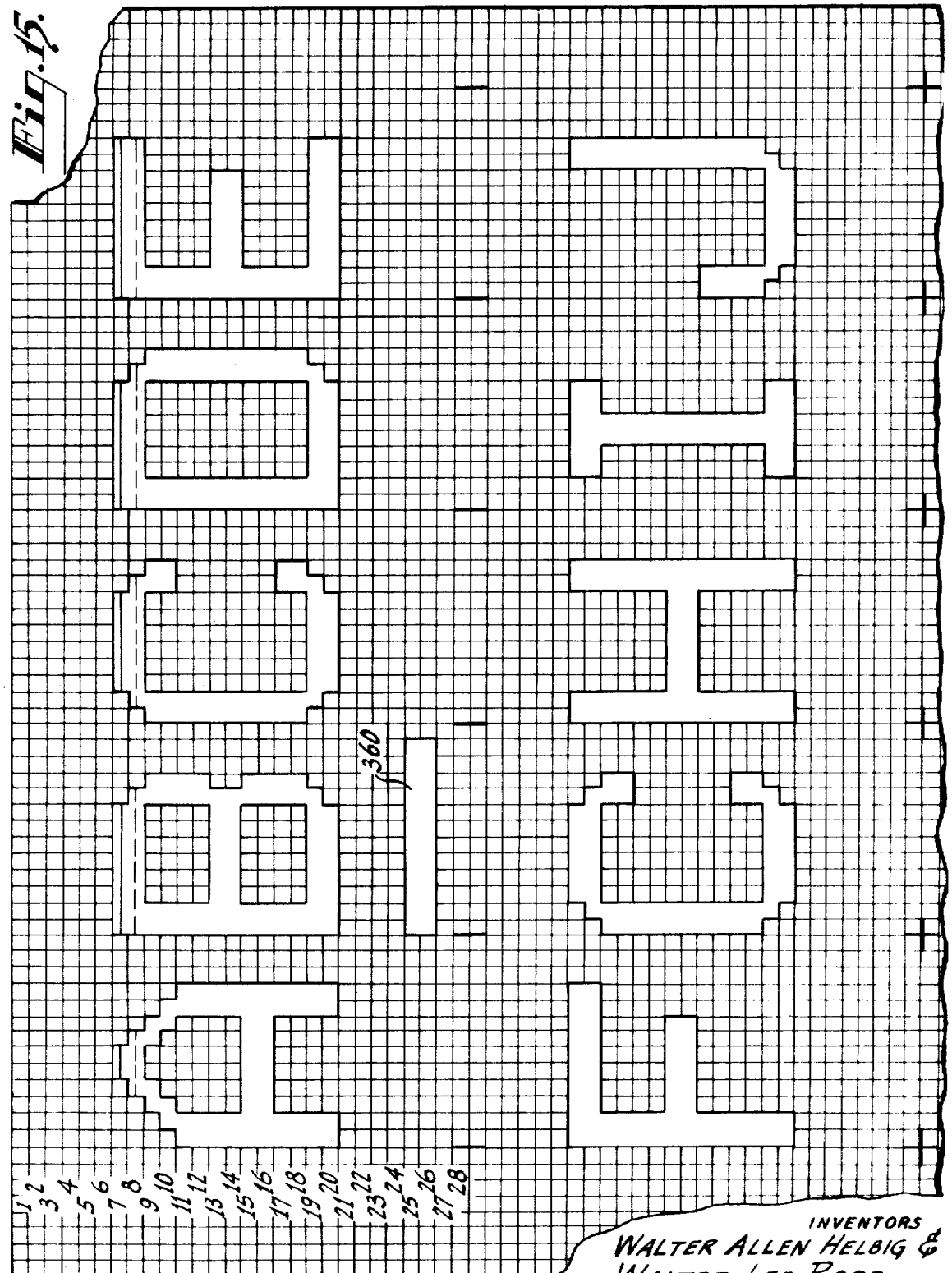
FIG. 15 shows some of the characters as they are displayed on the screen of the display means.

It may be in order, at this point, to refer for a moment to FIG. 15. This shows some of the characters as they are actually presented on the screen of the television receiver. Each row consists of 28 television scan lines which are numbered 1 through 28 in FIG. 15 and is sufficiently long to display 32 characters (although only 5 such characters are shown per row in FIG. 15). During the first field of a frame, the odd lines are written and during the second field of the frame the even lines are written. Each character in a row, including the space between characters, occupies the space equivalent to 13 bits. In FIG. 15, each such bit is represented by a small square. In general, the thirteenth bit is always a zero, representing a blank space to insure that there is always a space between two adjacent characters.

Returning now to FIG. 11, the information for row 1 is supplied directly to the character generator CG1 and the latter translates the 8 bit character codes to the video signals to be employed to intensity modulate the cathode ray beam of a particular display. To start with, the switching network 316 connects this character generator to display D1 so that this video information will be written on display D1. In the example shown in FIG. 15, for row 1, line 1 is blank and this means that the character generator CG1 is producing all zeros for the entire line 1 of row 1 of display D1.

Returning to FIG. 13, it may be observed that after line time 6, memory B produces an output comprising the characters for row 1 of display D2. This information is applied via OR gates 312 and 314 to shift registers SR1$a$ and SR1$b$ and to character generator CG1. At this same instant of time, the information present in shift register SR1$a$ and SR1$b$ is being clocked out of these shift registers and into shift registers SR2$a$ and SR2$b$ and this same information, that is, the output of shift registers SR1$a$ and SR1$b$, is applied to character generator CG2. This, it will be recalled, is the 32 character codes containing all of the information necessary for row 1 of display D1. The character generataor CG2 extracts from this information that necessary to generate the video for line 3 of row 1 of display D1 and applies it through the switching network 316 to display D1. At the same time, character generator CG1 extracts from the characters which it receives the information necessary to generate the video for line 1 of display D2 to which it is at this time connected by network 316.

The process described above continues until all of the shift registers SR1$a$ to SR12$a$ and SR1$b$ to SR12$b$ are loaded and during this loading the character generators are simultaneously operative, each generating the video of a particular line of a particular display during each scan line interval. For example, when shift registers SR12$a$ and SR12$b$ are supplying outputs to character generator CG13 indicative of row 1 of display D1, character generator CG13 is producing the video information for writing line 25 of row 1 of display D1. At the same time, the immediately preceding character generator CG12 (not shown) is writing line 23 of display D2. At the same time, character generator CG11 is writing line 21 of row 1 of display D3; simultaneously, character generator CG10 (not shown) is writing line 19 of display D4 and so on, all as shown in the following chart.

| Character generator No. | Line No. | SUCCESSIVE HORIZONTAL SCAN LINE PERIODS | | | | | | | | | | | | | | | | | | | | | |
|---|---|---|---|---|---|---|---|---|---|---|---|---|---|---|---|---|---|---|---|---|---|---|---|
| | | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| CG1 | 1 | D1 | D2 | D3 | D4 | D5 | D6 | D7 | D8 | D9 | D10 | D11 | D12 | D13 | D14 | D1 | D2 | D3 | D4 | D5 | D6 | D7 | D8 | D9 |
| CG2 | 3 | | D1 | D2 | D3 | D4 | D5 | D6 | D7 | D8 | D9 | D10 | D11 | D12 | D13 | D14 | D1 | D2 | D3 | D4 | D5 | D6 | D7 | D8 |
| CG3 | 5 | | | D1 | D2 | D3 | D4 | D5 | D6 | D7 | D8 | D9 | D10 | D11 | D12 | D13 | D14 | D1 | D2 | D3 | D4 | D5 | D6 | D7 |
| CG4 | 7 | | | | D1 | D2 | D3 | D4 | D5 | D6 | D7 | D8 | D9 | D10 | D11 | D12 | D13 | D14 | D1 | D2 | D3 | D4 | D5 | D6 |
| CG5 | 9 | | | | | D1 | D2 | D3 | D4 | D5 | D6 | D7 | D8 | D9 | D10 | D11 | D12 | D13 | D14 | D1 | D2 | D3 | D4 | D5 |
| CG6 | 11 | | | | | | D1 | D2 | D3 | D4 | D5 | D6 | D7 | D8 | D9 | D10 | D11 | D12 | D13 | D14 | D1 | D2 | D3 | D4 |
| CG7 | 13 | | | | | | | D1 | D2 | D3 | D4 | D5 | D6 | D7 | D8 | D9 | D10 | D11 | D12 | D13 | D14 | D1 | D2 | D3 |
| CG8 | 15 | | | | | | | | D1 | D2 | D3 | D4 | D5 | D6 | D7 | D8 | D9 | D10 | D11 | D12 | D13 | D14 | D1 | D2 |
| CG9 | 17 | | | | | | | | | D1 | D2 | D3 | D4 | D5 | D6 | D7 | D8 | D9 | D10 | D11 | D12 | D13 | D14 | D1 |
| CG10 | 19 | | | | | | | | | | D1 | D2 | D3 | D4 | D5 | D6 | D7 | D8 | D9 | D10 | D11 | D12 | D13 | D14 |
| CG11 | 21 | | | | | | | | | | | D1 | D2 | D3 | D4 | D5 | D6 | D7 | D8 | D9 | D10 | D11 | D12 | D13 |
| CG12 | 23 | | | | | | | | | | | | D1 | D2 | D3 | D4 | D5 | D6 | D7 | D8 | D9 | D10 | D11 | D12 |
| CG13 | 25 | | | | | | | | | | | | | D1 | D2 | D3 | D4 | D5 | D6 | D7 | D8 | D9 | D10 | D11 |

In the chart above, the numbers at the top represent successive scan line periods. These are arbitrarily reference periods, each one horizontal scan line interval, that is, each 63½ microseconds in duration. During any one interval, such as scan line interval 19, all of the events depicted in the body of the chart occur concurrently. For example, during scan interval 19, character generator CG1 is writing line 1 of row 1 on display D14; character generator CG2 is writing line 3 of row 1 on display D13; character generator CG3 is writing line 5 of row 1 on display D12 and so on, concluding with character generator CG13 writing line 25 of row 1 on display D2.

Within the body of the table, the numbers to the right of the zigzag line represent row information for the following row. Thus, if during scan line period 24, character generator CG1 is writing line 1 of row 2 on display D5 then: character generator CG2 is writing line 3 of row 2 on display D4 . . . character generator CG5 is writing line 9 of row 2 on display D1; but character generator CG6 is writing line 11 of row 1 on display D14 and the remaining character generators CG7–CG13 are also writing lines of row 1.

It may be observed that there is no character generator for lines 27 and 28. The reason is that these lines are always blank to insure that there is always a space between two successive rows of information on the screen of the television receiver. It should also be mentioned that, in practice, there may be a parity checker between the OR gates and the first pair of shift registers SR1a and SR1b, however, since it plays no major part in the present invention it is not shown or discussed further.

The discussion above has traced the operation for the writing of one row of information on all 14 television receivers. After the first row is written, the second row is written. It may be observed from FIG. 13 that after row 1 for display D14 is read out of memory G (this occurs during scan line 19), row 2 for display D1 is read out of memory A (during scan line 20). During the following scan line 21, row 2 for display D2 is read out of memory B; during the following scan line 22 row 2 of display D3 is read out of memory C and so on. The process continues until the last row of information for display D14 is read out of memory G.

With the completion of one cycle, that is, the period extending from row 1 stored in memory A through the last row stored in memory G (there are actually 16 rows of characters stored for each television screen) one complete field has been written on all 14 television receivers. These 14 receivers, of course, may be displaying entire different "pages" of information and these may correspond, for example, to 14 different courses of instructions.

After a suitable delay to permit vertical retrace, the entire process repeats again. However, the second time around, the information stored in memories A through G, rather than being written on the odd numbered lines of the various television displays, is written on the even numbered lines. Thus, the second time around, character generator CG1 writes the video information on line 2 of the successive displays. First it writes on line 2 of display D1 then on line 2 of display D2 then on line 2 of display D3 and so on. In similar manner, character generator CG2 first writes on line 4 of display D1, then on line 4 of display D2, then on line 4 of display D3, and so on. Thus, the second field becomes interlaced with the first field to provide the two fields necessary for one frame of television information.

By suitable coding, the second field can be made non-identical with the first field to provide more pleasing characters. For example, as seen in FIG. 15, character generator CG4, during the first field, writes the information shown in solid line along television scan line 7. During the second field, the same character generator writes as shown in dotted line, along television scan line 8. Note that for the letter E, the information is identical in the two lines but for the remaining characters A, B, C, and D, the information is not identical for these two particular lines. This operation is achieved within respective character generators by simple decoding techniques.

SHIFT REGISTERS SR

Figure 16:
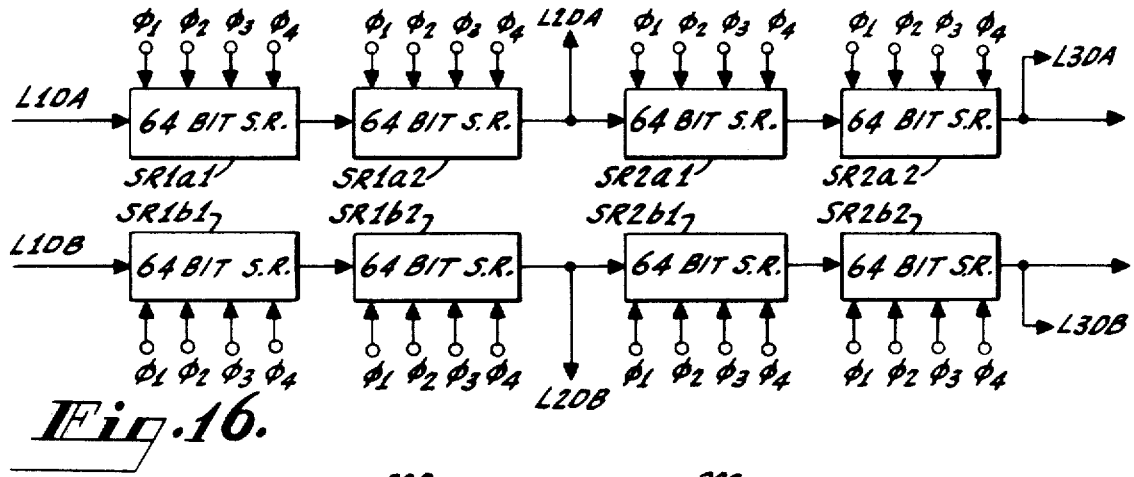
FIG. 16 is a somewhat more detailed showing of the shift registers of FIG. 11.

A somewhat more detailed showing of two pairs SR1 and SR2 of the shift registers in FIG. 11 appears in FIG. 16. Shift register SR1a consists of two halves SR1a1 and SR1a2 which together make up the 128 bit shift register. This is merely for purposes of convenience as such 64 bit registers are available commercially. In similar manner, the shift register SR1b consists of two registers, each for storing 64 bits. In one practical design the registers employed were of the metal oxide semiconductor (MOS) type, General Instruments Part No. MEM 3064 which required four phrase clock pulses, as discussed below, for shifting. However, it is to be appreciated that the system may be implemented with different shift registers having other shift pulse requirements.

The outputs from memories A through G are successively received at L1DA and L1DB, in parallel, as already discussed. The information is shifted through the registers by the shift pulses $\phi_1$ . . . $\phi_4$, which shift pulses may either be the same shift pulses as are employed to shift the registers 304 and 306 of FIG. 10, or may be synchronous with these shift pulses. The registers 304 and 306, incidentally are the registers 80a through 80d of FIGS. 4a and 4b. The shift pulses employed there during the rapid recirculation of the characters through the shift registers are CR $\phi_1$ through CR $\phi_4$ and are shown schematically in FIG. 8. Note that there are 128 pulses in each set so that one sequence, such as CR $\phi_1$, CR $\phi_2$, CR $\phi_3$, CR $\phi_4$ of shift pulses, shift a stored bit one position forward in its register.

The outputs L2DA and L2DB of the registers SR1a and SR1b, respectively, which outputs are serially occurring bits representing characters, are applied to the character generator CG2, as shown in FIG. 11. Similarly, the outputs of the succeeding pairs of shift registers are applied to the succeeding character generators.

CHARACTER GENERATOR

Figure 17:
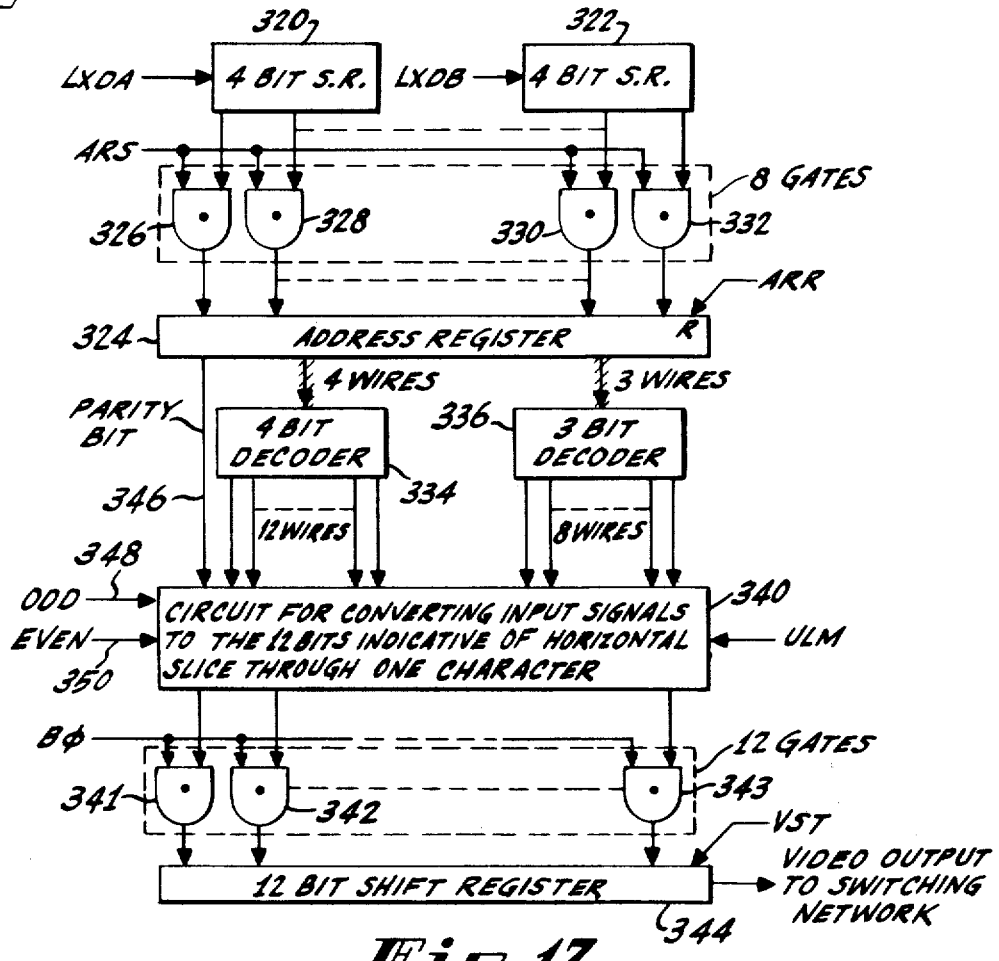
FIG. 17 is a block diagram of a typical character generator for the system of FIG. 11.

The various character generators of FIG. 11 are all similar in principal although they differ in detail in one circuit, namely in the circuit employed for converting the input ASCII code signals to the video signals. One such character generator which is representive is shown in FIG. 17. It includes two four bit registers 320 and 322 connected through 8 output gates to an address register 324. To simplify the drawing, only four of the output gates 326, 328, 330 and 332 are shown. The address register is connected through a decoder consisting of a 4 bit decoder 334 and a 3 bit decoder 336 to the character code to video signal conversion circuit 340. The latter is connected through 12 output gates three of which are shown at 341, 342 and 343 to a 12 bit shift register 344.

In the operation of the character generator of FIG. 17, in response to shift pulses corresponding to $\phi_1$, $\phi_2$, $\phi_3$, $\phi_4$ of FIG. 16, the two registers 320 and 322 together accumulate the 8 bits which define the character. (In practice, the shift pulses applied to register 320 and 322 are synchronous with but are delayed one bit time relative to those applied to the SR registers to allow time for the data to pass through the parity checker (not shown) mentioned previously.) These 8 bits, for example, may represent the letter C.

When these two registers are filled, the signal ARS, which may be derived from the shift pulses, occurs so that the 8 bits stored are gated through the 8 output gates 326 . . . 332 to the address register 324. Seven of the 8 bits are decoded at 334 and 336 to produce a particualr combination of signals on 20 different wire (12 wires from decoder 334 and 8 from decoder 336). These signals are applied to the conversion circuit 340. While in the present example two decoding levels 334 . . . 336 and 340 (not shown explicitly) are employed to permit some saving in logic gates, it is to be appreciated that a single decoder may be used instead.

The eighth bit from the address register is a parity bit and it is applied via lead 346 to the circuit 340. One other signal is applied via line 348 or 350 to indicate to circuit 340 whether an odd or an even line is to be drawn on the screen. As already mentioned, the odd lines occur during the field one of each frame and the even lines during field two of the frame. Another signal which may be applied to circuit 340 is ULM and this indicates whether bit 8 is to be interpreted as a parity error or as an underline signal. ULM is generated by a switch on the control panel and when the system is in the underline mode the parity checker is not used.

The circuits within block 340 may take any ont of a number of different forms. As one example, these circuits may merely comprise a group of logic gates connected via 12 different output lines to the group of 12 AND gates 341 . . . 343. These gates, in response to the values of the inputs they receive on the various input lines, produce a particular pattern of ones and zeros which represent one slice through one character.

For example, suppose the ASCII code stored at 320, 322 represents the letter C and suppose also that the character generator is CG4 and that the line to be drawn is scan line 7. In this case, the converter 340, in response to the inputs it receives, will produce signals representing the binary number 001111110000 at its 12 output leads. (See scan line 7 of character C in FIG. 15.) The signals are applied to the 12 bit shift register and are subsequently shifted out of the register and applied to the intensity modulation means of the television display then connected to that character generator via the switching network 316 of FIG. 11. The shifting out of the information from the register 344 is at a rate synchronous with that of the television scanning and the shift pulses, in fact, may be derived from the television receiver by, for example, frequency multiplier circuits. These shift pulses are at the video hit rate, there are twelve of them for each four CR$\phi$1 pulses, and they occur during $^{12}\!/_{13}$ of the time a character is being displayed. During the thirteenth bit time, the pulse B$\phi$ is generated which loads the shift register with the next character pattern.

As one other example, suppose again FIG. 17 represents the same character generator that the same character C is stored in the two 4 bit registers, 320, 322 but that the signal on line 350 indicates that it is line 8 which is to be drawn. Now the circuit 340 will produce an output where 011111111000. As can be seen from FIG. 15, this is the word which represents the slice taken along line 8 of character C.

The logic gates within the block 340 are not illustrated as they in themselves are conventional. For example, they may consist of a group of AND gates selected ones of which are enabled in response to a particular combination of input bits to produce the desired 12 bit word on the 12 output lines. Alternatively, NAND or NOR gates may be employed instead.

One other conventional means which may be employed for circuit 340 and decoders 334 and 336 is a read-only memory. Here, the bits provided by address register 324 and the other input bits together serve as an input address to the read-only memory. In response to this address, the read-only memory will produce a 12 bit output word representing the appropriate slice through the character to be drawn on the television screen.

It has already been mentioned that 13 spaces are allotted for each character. All character generators except character generator CG13 can produce output words with a maximum of only 12 bits. The 13th space is not used to prevent the characters from running together.

The character generator of the present system also has the capability of indicating that parity is incorrect. In response to such an indication produced by the parity check circuit (not shown), all 13 character generators CG1 through CG13 produce words of 12 bits, all of which are ones. Thus, the 13 character generators will cause to be drawn in the area to be occupied by a possibly erroneous character, a solid twelve bit wide rectangle extending from line 1 through line 26. It is also possible, of course, to modify the circuit to show any other incorrect parity indication.

While no dimensions are given in FIG. 15, in practice, each dot, that is, each small square represents a time interval of approximately 100 nanoseconds, in the horizontal scan direction. The 28 lines in the vertical direction of FIG. 15 may represent the distance of perhaps a quarter of an inch, depending upon the overall size of the television screen.

One final point worth mentioning in connection with the displays has to do with the vertical retrace. From the table given previously, it is clear that if all of the vertical retrace periods occur at the same time, the successive displays will start the same row on different horizontal scan lines. For example, if the first display D1 starts line 1 of row 1 on scan line 6, the second display D2 will start the same line of its first row on scan line 7 the third display D3 will start the same line of row 1 on scan line 8 and so on. One simple method for starting the same row on all displays on the same scan line is to stagger the vertical retrace periods. For example, display D14 may start its scan line 1 during one scan period; display D13 will then start its scan line 1 during the following scan period and so on so that display D1 starts its vertical retrace 14 horizontal scan lines after display D14.

In practice, it has been found not necessary to go to the trouble above. Instead, five different vertical retrace periods are employed each starting three horizontal scan lines later. The earliest vertical retrace occurs for displays D1, D2 and D3 and the last for displays D13 and D14. Operated in this way, there is still minor variation within each group of displays in the line on which a particular row starts. For example, row 1 of display D3 will start two lines later row 1 of display D1, that is, if row 1 of display D1 starts on horizontal scan line 6, the same line of row 1 of display D3 will start on horizontal scan line 8. However, this minor variation is hardly detectable by the eye and is found to introduce no difficulty.

SWITCHING NETWORK

Figure 14:
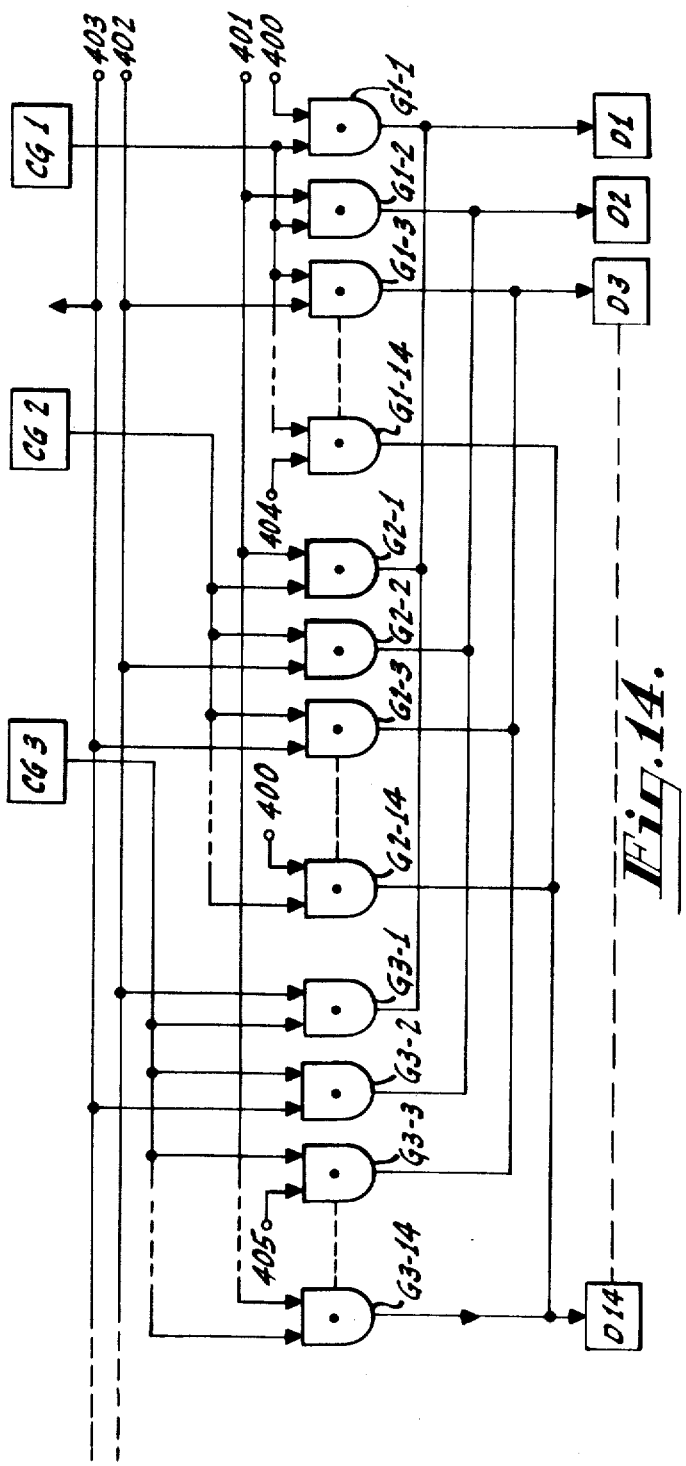
FIG. 14 is a somewhat more detailed showing of a portion of the switching network of FIG. 11.

The switching network 316 of FIG. 11 is represented, in part, in FIG. 14. In practice, the circuits are somewhat more complex than those shown, however, for purposes of the present application, those of FIG. 14 illustrate what is intended.

As already mentioned, there are 13 character generators CG1 through CG13 and 14 television type displays D1 through D14. A group of 14 AND gates is associated with each character generator. The first, second, third and fourteenth gates of the first three groups of gates are illustrated in FIG. 14. Each group of gates is connected at one input terminal to its character generator and at another input terminal to a lead for priming that gate. The first gate of each group is connected to display D1, the second to display D2 and so on. The priming leads are connected concurrently to prime one gate in each group. Thus, the priming signal applied to terminal 401 concurrently primes gate G1–2 of the first group; gate G2–1 of the second group; gate G3–14 of the third group; gate G4–13 (not shown) of the fourth group and so on. This group of gates, when enabled, permit character generator CG1 to write, for example, line 1 on display D2 at the same time that character generator CG2 is writing line 3 on display D1, at the same time that character generator CG3 is writing line 26 of the previous row on display D14. This, agrees with the table given previously. The table may be employed also to trace the remainder of the operation of the circuit shown in part in FIG. 14.

It is to be appreciated that the specific switching network illustrated for FIG. 14 is intended only to be representative. Other logic gates than those shown may be employed and other switching configurations are, of course, also possible.

FIG. 1

FIG. 1 shows again the memory of FIG. 10 and some of the related circuits. The circulating memory 24 corresponding to delay line 300 of FIG. 10 is a relatively inexpensive magnetostrictive delay line which includes the input and output amplifiers for increasing, in the required amount, the level of power of the signals applied to and received from the delay line. In reasonably large quantities, such delay lines cost $150.00 each, or less. Unfortunately, delay lines in this price range are not temperature-compensated and the delay introduced by any delay line chosen for one system may not be precisely the same as that of the delay line for a different system. The delay line memory 24 is sufficiently long to store two complete fields of the information it is desired to display on the screens of two conventional television receivers (one field for each receiver).

In the system as already discussed, it is desired to display 16 rows of characters on each television screen, each row occupying 14 horizontal scan lines, per field, on its screen. Each row of characters consists of 32 information characters which are displayed and one control character which is not displayed. The latter is hereafter termed a "Bell code" and its purpose is to signal the end of one row and the start of the next row. The delay line therefore stores 33 characters times 32 rows (16 rows for each display) or 1056 characters.

Each character is stored in the delay line memory as an eight-bit code. Seven of the bits represent information and the eighth bit is a parity bit. The code employed may be the well-known ASCII code. To simplify the discussion which follows, the parity bit, in some cases, is not referred to specifically.

A binary digit in the delay line memory is located within a time interval of roughly 1.25 microseconds (actually 1.241 microseconds). This time interval is hereafter termed a bit time. However, the actual duration within this time interval of a binary digit is 0.5 microsecond. Thus, for each eight bit character stored in the delay line, the time equivalent of 8 × 1.25 microseconds ≅ 10 (actually 9.928) microseconds must be allotted.

A conventional television type display such as D1, D2 and so on employs two fields which are interlaced to make up one frame. Only a single field of information for each display is generated each time data is read from the delay line memory 24. After the data is used to generate its image for the first field on the screen of each television display, it is returned to the delay line memory and when it becomes available again, this same data is used to generate its image for a second field on the display which is interlaced with the first field to provide, on each display, one frame of display information. The information displayed on the two television receivers associated with each delay line, in general, will be different—for example, two different lessons of an educational program.

The system of FIG. 1 is locked to the system time base frequency provided by source 28. This, for example, may be the 60 hertz power line source. The television type displays include circuits which produce the necessary sweep waveforms and other timing waveforms which are synchronous with 60 hertz.

The timing pulse source 30 includes a stable oscillator which is also synchronized with the system time base. For purposes of the present explanation, the timing source 30 may be considered to produce the various timing and control voltages some of which have already been discussed and others of which will be discussed later. A number of these waves are applied to the circuits 32 whose purpose is to synchronize the information read from delay line memory 24 with the system time base.

The circuits within blocks 26 and 32 are illustrated in FIGS. 3–5 and discussed at length later.

The synchronized information derived from the delay line memory is placed in the shift register within block 26 for a short interval of time and is transferred from the shift register to the shift registers SRa and SRb of FIG. 11 as already described. The remaining circuits of FIG. 1 have already been discussed.

After the short interval required for the shift register within block 26 to transfer its information to the character generator 34, it returns the information it is storing to the write circuits 36 which, in turn, apply this information to the delay line memory 24. As the information is being returned to the delay line memory, the latter is supplying new information via the circuits 32 to the shift register within block 26.

It is also possible in the system of the present invention to replace the information in the delay line memory 24 with new and different information. As one example, the information may be replaced with new information supplied by the digital computer of an instructional system. As another example, the information may be modified by new information provided by a keyboard at the student terminal of an instructional system. These various sources are shown generally in FIG. 1 by the block 38, legended "External Source of Data" and are also indicated by the legends at the lower left of FIG. 11.

FIGS. 2 AND 9

The timing of various operations of the system of FIG. 1 is illustrated, in part, in FIG. 2. Assume that the delay line memory 24 is supplying information to the shift register 26 through the circuits 32, the shift registers are supplying information to the character generator 34 and back to the delay line memory 24, and the character generators are supplying video information to the television displays D1 and D2. The horizontal synchronizing pulses which are spaced 63.5 microseconds apart and are synchronous with the standard frequency of 12.083916 mhz. (megahertz) are shown at the upper part of the figure.

To start with, the information necessary for writing the first row of information on display D1 is read out of the memory. As already mentioned, each bit stored in the delay line is located within a bit interval 1.241 microseconds in duration. This means that each eight-bit character occupies the equivalent of 9.928 microseconds of the delay line length. Therefore, six and a fraction characters can be read out of the memory during each scan line, that is, during each 63.5 microseconds. In an interval of slightly more than 5 scan lines (5.24 scan lines), the 32 characters to be displayed and the 33rd or Bell code character may be read out of the memory. However, due to drift, the location of these 33 characters is not known precisely and therefore an interval of 5⅓ scan lines, or about 350 microseconds is allowed for these characters. This is roughly 20 microseconds more than the time occupied by the characters and this allows drift of the characters to the extent of plus or minus about 10 microseconds during their travel through the delay line without leaving the 5½ scan line time "slot."

After the interval equivalent to 5½ scan lines, there is a pause in the system for a half scan line. During the 5½ scan lines, the information passes through the synchronizing circuits to the shift register 26. It can be considered, for purposes of the present explanation, that during the one-half scan line pause, the information is held without movement or modification in the shift register 26. During the next scan line interval, the information in the shift register within block 26 is applied from the shift register to the shift registers SRa and SRb and to the character generators and at the same time the information is recirculated, at high speed, once around the shift register, all as already discussed. As will be shown later, the shifting is at an effective rate of 6.041958 megabits per second and it requires only 42.37037 microseconds to complete the ring shift of the 32 characters (256 bits). This 42.37 microsecond interval occurs at roughly the center of the 63.5 microsecond horizontal scan period. The position of the 42.37 microsecond interval determines where on the screen the characters will appear and also the size of the left and right margins. As the horizontal retrace interval is about 10 microseconds, each margin may have a width equivalent to about 5 microseconds.

The 32 eight-bit characters shifted into the character generators, are written on the screens of the displays as already discussed.

Immediately after the information for row 1 of display D1 is recirculated once in the shift register of stage 26, it is started back to the delay line memory 24. The start of the write in is shown to occur seven line times after the start of the time during which this same row is read from the delay line. The delay line inserts a delay equivalent to 255.5 horizontal scan lines. Therefore, this row of information will be present at the output of the delay line 255.5+7=the time equivalent of 262.5 scan lines after the first readout of this line starts. This delay of 262.5 scan lines is precisely one field time (including the vertical retrace time) for a commercial television receiver so that (ignoring drift in the delay line) each row of information will be properly synchronized with the television display each time it arrives from the delay line. (This drift is compensated for by the circuits in block 32.)

Figure 9:
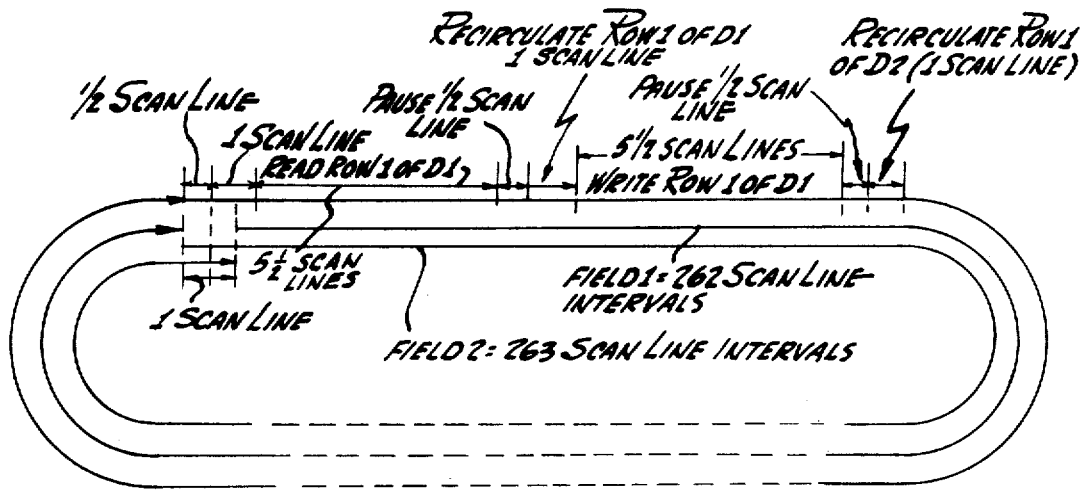
FIG. 9 is another drawing to explain the timing relationship among various operations in the system of FIG. 1.

There is a delay of 7 scan lines between the time the data is received from the line and the time it is returned to the line as shown in FIG. 2. The actual delay between two periods that the same bits of information are supplied to the character generator 34 from the shift register of stage 26 alternates between 262 and 263 scan line intervals. This is to insure proper interlace. The way this half scan line (255.5+0.5 and 255.5−0.5) time variation is achieved field-to-field is illustrated in FIG. 9.

The "writing" of information into the delay line starts at some precise time coincident with the start of a scan line. The write in of row 1 for display D1, for example, starts at the end of scan line 14 of display D1 and is completed within slightly more than 5 scan line intervals, although a 5½ scan line interval is allotted to receive this information. During the time this information, that is, the information for row 1 of display D1 is being returned to the delay line memory, the delay line memory is applying output signals for row 1 of display D8 to the shift register within block 26. Thus, as the information is being taken from one end of the shift register, information for the eighth television display D8 is being accepted ("read") from the memory at the opposite end of the shift register. The read out of the delay line memory starts a short interval (a small fraction of a scan line) after the start of the writing in of the information to the delay line. All of this is occurring during the time the character generators are writing part of row 1 on display D1.

After the information for row 1 of display D8 is read out of the delay line, there is a half scan line interval pause and then the shift register within block 36 sends the information it is storing to the shift registers SR$a$ and SR$b$ and to the character generators and at the same time, recirculates this information once in the shift register. The recirculation occurs within one scan line interval as already discussed.

The process described above continues until one entire field of characters (14 lines per row × 16 rows=224 lines) is written on each display. In the delay line, each row of information is located within a time interval having the duration of only seven scan line periods so that the 32 rows require a delay line length equivalent to 32×7=224 television scan line periods or 14,224 microseconds. The actual line length is the time equivalent of 255.5 scan line periods. The difference—21.5 scan line periods plus the approximately 7 scan line delay introduced in stage 26 is to permit sufficient time for vertical retrace of the displays and for the top and bottom margins of the displays.

After the first field is written on each display, and after the delay necessary for vertical retrace and margins has elapsed, the system applies to each display another field timed to interlace with the first field to provide one complete frame of each display. The second field for a display is, of course, the same field already applied once to that display. This refresh process automatically repeats for as long as desired. The information displayed can, however, be changed by erasing (removing) the old information in the delay line and replacing it with new information. This new information may be supplied by the data processing machine within source 38.

The table which follows illustrates the timing discussed above. FIG. 9 also illustrates this timing in a more schematic way.

| DELAY LINE PERIODS (63.5 μs per period) | READ ROW | FOR DISPLAY | WRITE ROW | FOR DISPLAY | DISPLAY D1 | SCAN LINES | D8 | SCAN LINES |
|---|---|---|---|---|---|---|---|---|
| 1-7 | 1 | D1 | | | Blank | 1-7 | Blank | 1-14 |
| 8-14 | 1 | D8 | 1 | D1 | Row 1 | 8-21 | Row 1 | 15-28 |
| 15-21 | 2 | D1 | 1 | D8 | | | | |
| 22-28 | 2 | D8 | 2 | D1 | Row 2 | 22-35 | | |
| 29-35 | 3 | D1 | 2 | D8 | | | Row 2 | 29-42 |
| 36-42 | 3 | D8 | 3 | D1 | Row 3 | 36-49 | | |
| 43-49 | 4 | D1 | 3 | D8 | | | Row 3 | 43-56 |
| 50-56 | 4 | D8 | 4 | D1 | Row 4 | 50-63 | | |
| 57-63 | 5 | D1 | 4 | D8 | | | Row 4 | 57-60 |
| 64-70 | 5 | D8 | 5 | D1 | Row 5 | 64-77 | | |
| 71-77 | 6 | D1 | 5 | D8 | | | Row 5 | |
| 78-84 | 6 | D8 | 6 | D1 | Row 6 | 78-91 | | |
| 85-91 | 7 | D1 | 6 | D8 | | | Row 6 | |
| 92-98 | 7 | D8 | 7 | D1 | Row 7 | 92-105 | | |
| 99-105 | 8 | D1 | 7 | D8 | | | Row 7 | |
| 106-112 | 8 | D8 | 8 | D1 | Row 8 | 106-119 | | |
| 113-119 | 9 | D1 | 8 | D8 | | | Row 8 | |
| 120-126 | 9 | D8 | 9 | D1 | Row 9 | 120-133 | | |
| 127-133 | 10 | D1 | 9 | D8 | | | Row 9 | |
| 134-140 | 10 | D8 | 10 | D1 | Row 10 | 134-147 | | |
| 141-147 | 11 | D1 | 10 | D8 | | | Row 10 | |
| 148-154 | 11 | D8 | 11 | D1 | Row 11 | 148-161 | | |
| 155-161 | 12 | D1 | 11 | D8 | | | | |

| (continued) DELAY LINE PERIODS (0.5 μs per period) | READ | | WRITE | | DISPLAY | | | |
|---|---|---|---|---|---|---|---|---|
| | ROW | FOR DISPLAY | ROW | FOR DISPLAY | D1 | SCAN LINES | D8 | SCAN LINES |
| 162-168 | 12 | D8 | 12 | D1 | Row 12 | 162-175 | Row 11 | |
| 169-175 | 13 | D1 | 12 | D8 | | | | |
| 176-182 | 13 | D8 | 13 | D1 | Row 13 | 176-189 | Row 12 | |
| 183-189 | 14 | D1 | 13 | D8 | | | | |
| 190-196 | 14 | D8 | 14 | D1 | Row 14 | 190-203 | Row 13 | |
| 197-203 | 15 | D1 | 14 | D8 | | | | |
| 204-210 | 15 | D8 | 15 | D1 | Row 15 | 204-217 | Row 14 | |
| 211-217 | 16 | D1 | 15 | D8 | | | | |
| 218-224 | 16 | D8 | 16 | D1 | Row 16 | 218-231 | Row 15 | 211-224 |
| 225-231 | | | 16 | D8 | | | | |
| 232-238 | | | | | Blank and VERT Retrace | 231-262 1/2 | Row 16 | 225-238 |
| 230-255 1/2 | | | | | | | Blank and VERT Retrace | 239-262 1/2 |
| 255 1/2 - 262 | | | | | Blank | 1-7 | | |

REPEAT STARTING AT DELAY LINE PERIOD 1

AND ENDING CYCLE AT

263 LINE TIMES

SYNCHRONIZATION CIRCUITS

FIG. 3 shows a number of the circuits for synchronizing information received from the delay line with the central time base of the system. The input from the delay line is the signal DL2D at the upper left which is one input to AND gate 10. It may be assumed for the present that the remaining two inputs to the AND gate 10, that is DLB2-O and ER210-N both represent the bit 1. Both of these signals may be considered as coming from the control area of the system. The DLB2-O signal indicates to the system that the vertical retrace period is complete. The ER210-N signal is an indication that it is not desired to erase the information stored in the delay line.

The AND gate 50 is disabled during the time information is being received from the delay line. One reason is that the ER210-P signal, which is complementary to the ER210-N signal, represents the bit 0. The remaining two signals at the input of AND gate 50 will be discussed later. The output of AND gate 10, when one is present, is applied through OR gate 12 to the four-stage register 500 which consists of flip-flops 51-54, respectively. The information stored in the flip-flop is advanced by the signal DQ-1 (see FIG. 7). The wave DQ-1 which may be derived from the clock pulses can be considered to consist of fifteen half periods $X_1$ through $X_{15}$. During the first two half periods, $X_1$ and $X_2$, the wave represents the bit 0 and thereafter it alternates between representing the bit 1 and the bit 0. Each time DQ-1 represents a 1, the information stored in the shift register 50 is advanced one stage.

It has already been mentioned that a bit in the delay line occupies a delay line length equivalent to 0.5 microsecond. This is substantially longer than the roughly 0.16 microsecond period of the shift wave DQ-1. Thus, in response to a single 1 from the delay line, the shift register 500, during successive periods, may store the successive words 1000, 1100, 1110, 0111, 0011, 0001 and 0000.

The 1 output terminals of the first two stages 51 and 52 of register 500 are connected through inverters 20 and 56 to OR gate 58 and are also connected to input terminals to AND gate 60. AND gate 60 is connected to the set terminal of flip-flop 62 and OR gate 58 applies its output to one input to AND gate 64. The 1 output terminal of the fourth flip-flop 54 of the register 500 is connected to one input terminal to AND gate 66. AND gates 64 and 66 are connected to the set input terminal of flip-flop 68 which may be termed the "data bit" flip-flop.

Figure 6:
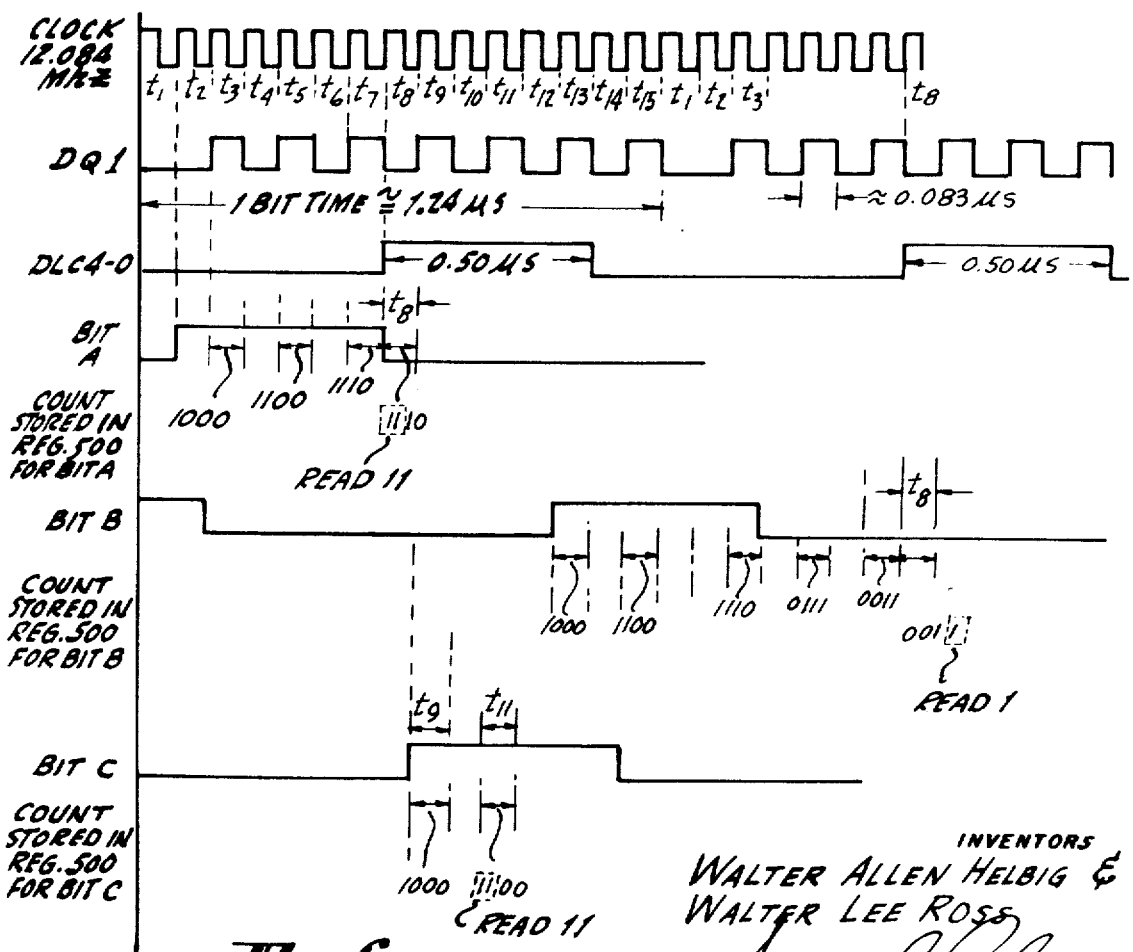
FIG. 6 is a drawing of waveforms to help explain the operation of certain of the circuits of FIG. 3.

The operation of the arrangement as discussed so far is depicted in FIG. 6. Assume that a bit legended bit A, starts arriving at the register 50 at the beginning of the time interval $t_2$. It may be assumed for the present that this bit is the first bit of the Bell code (00000111) for the 256 data bits which together define the 32 eight-bit characters for one row of information.

As the delay line employed is a relatively inexpensive delay line and not very accurate, one cannot be certain at which time the bit A will arrive from the delay line. If it arrives at the time shown, the shift register 500 stores the successive counts 1000, 1100, 1110, during the periods $t_3$, $t_5$ and $t_7$ of the clock and the corresponding half periods of the shift wave DQ-1.

During the next half period $t_8$ of the shift wave DQ-1, the enabling signal DLC4-O changes from 0 to 1. During this same half period, the count 1110 is stored in the register 500. Accordingly, three of the four inputs to AND gate 60 represent the bit 1. During the same period, flip-flop 70 at the lower part of the figure is reset, as is flip-flop 72. Therefore, the 0 outputs of flip-flops 70 and 72 are both relatively positive so that OR gate 74 produces a relatively negative output representing the bit 0. Inverter 76 therefore produces a relatively positive output representing the bit 1. This 1 is the fourth input to AND gate 60 so that AND gate 60 is enabled and sets flip-flop 62. OR gate 58 is also enabled and produces an output representing a 1. Thus AND gate 64 becomes enabled and it sets flip-flop 68.

All of the above occurs during the time interval $t_8$, even though the bit A arrived during the time interval extending from $t_2$ through $t_7$. The following seven bits of the Bell code and 256 bits of data in the delay line will also be clocked into the data bit flip-flop 68 at corresponding times $t_8$ of the following periods of DQ-1. (The assumption is made and this has been found to be the case in practice, that during the relatively short interval (5+scan lines) for one row of information in the delay line, there is no substantial drift of a bit of one character relative to a bit of any other character.) Thereafter, these bits will be synchronized with the trigger pulse DLC1 (see FIG. 7) for the three-bit shift register 75 consisting of stages 70, 70a and 70b.

Assume now that the first bit is bit B (FIG. 6) and it arrives during the time interval $t_{13}$ through $t_3$. Now, during the following time interval $t_8$ when the synchronizing pulse DLC4 changes from 0 to 1, the number 0011 is stored in register 500. Therefore, AND gate 60 remains disabled and flip-flop 62 remains reset. However, the 1 present in stage 54 of the register 500 passes through AND gate 66 and sets flip-flop 68. Therefore, even though the data bit B arrived in the period $t_{13}$ through $t_3$, it is clocked into the data bit flip-flop 68 during the period $t_8$. In a similar fashion, during the following periods $t_8$, the following 255 bits for a row will be clocked into the data bit flip-flop 68.

As a third example, assume the first bit is bit C (FIG. 6) and it arrives during the period extending from $t_9$ through $t_{14}$. Now during the period $t_9$, the register 500 will store 1000 and during the period $t_{11}$, the register 500 will store 1100. In response to the 11, registers 62 and 68 become set in the manner already discussed. During each following time interval $t_{11}$, the following bits coming from the delay line will be clocked into the data bit flip-flop 68.

The trigger pulse DLC1-N (FIG. 7) is applied through inverter 78 to the trigger terminal of register 75. This trigger pulse has a duration of approximately 0.083 microsecond and occurs once every bit interval that is once every 1.241 microseconds. This trigger pulse causes the successive bits stored in the data bit flip-flop 68 to be shifted into the shift register 75 and after each such shift, the reset pulse DLC8 clears stage 68. Thus if the first three bits which arrive from the delay line are 111, after three trigger pulses DLC1-N, these three bits will be stored in register 75 as 111, where the most significant bit is stored in stage 70 and the least significant bit in stage 70b. At this point in time, the bits are synchronized with DLC1-N regardless of where within a 1.241 microsecond bit time they happen to arrive from the delay line. It might also be mentioned that as soon as the first flip-flop 70 becomes set, the OR gate 74 and inverter 76 disable AND gate 60 so that the flip-flop 62 remains in whatever state it happens to be, either set or reset. Shortly thereafter, flip-flop 72 becomes set and remains set for the entire row interval. This disables AND gate 60 via 74 and 76 for the entire row interval.

Figure 4A:
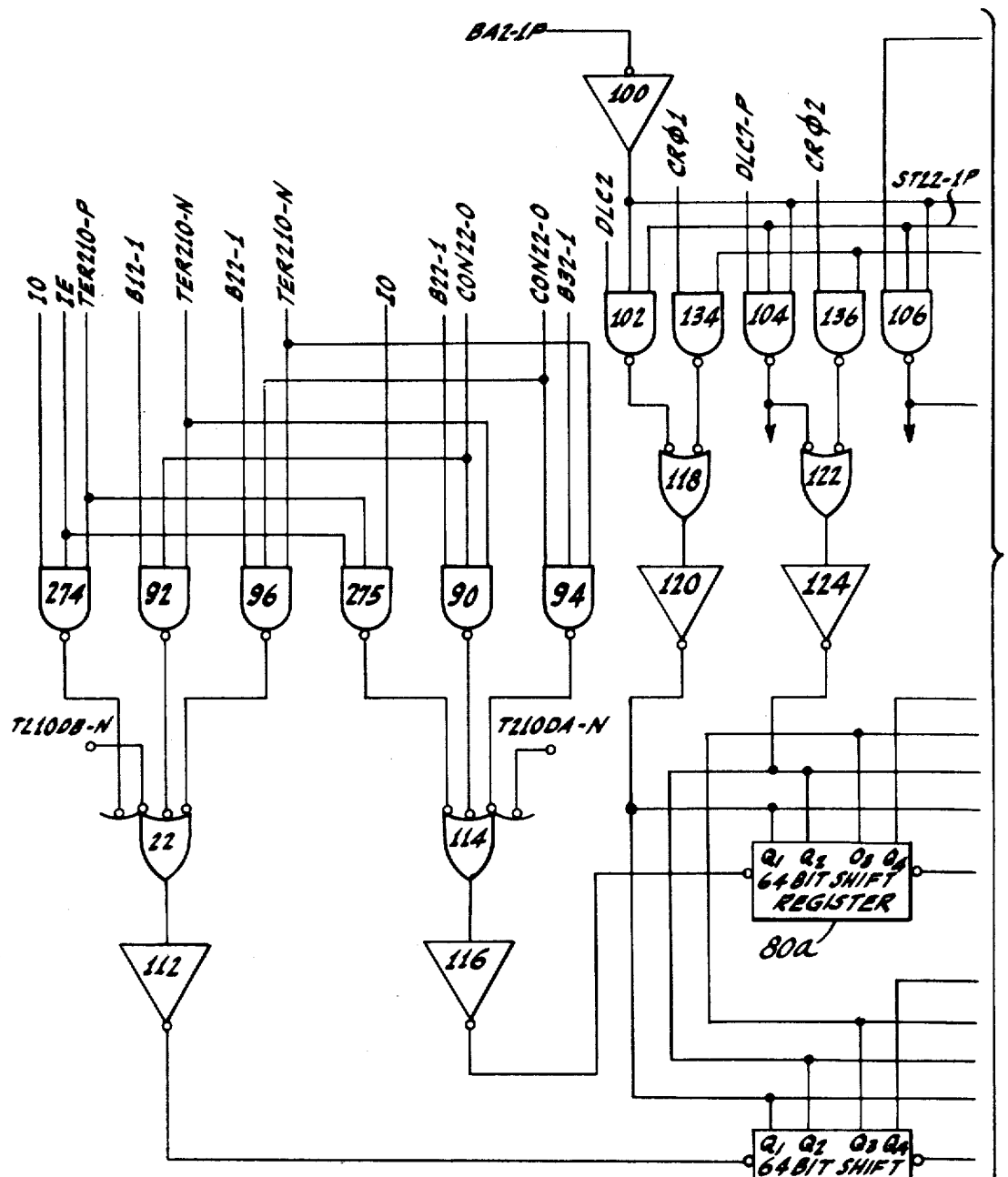
Figure 4B:
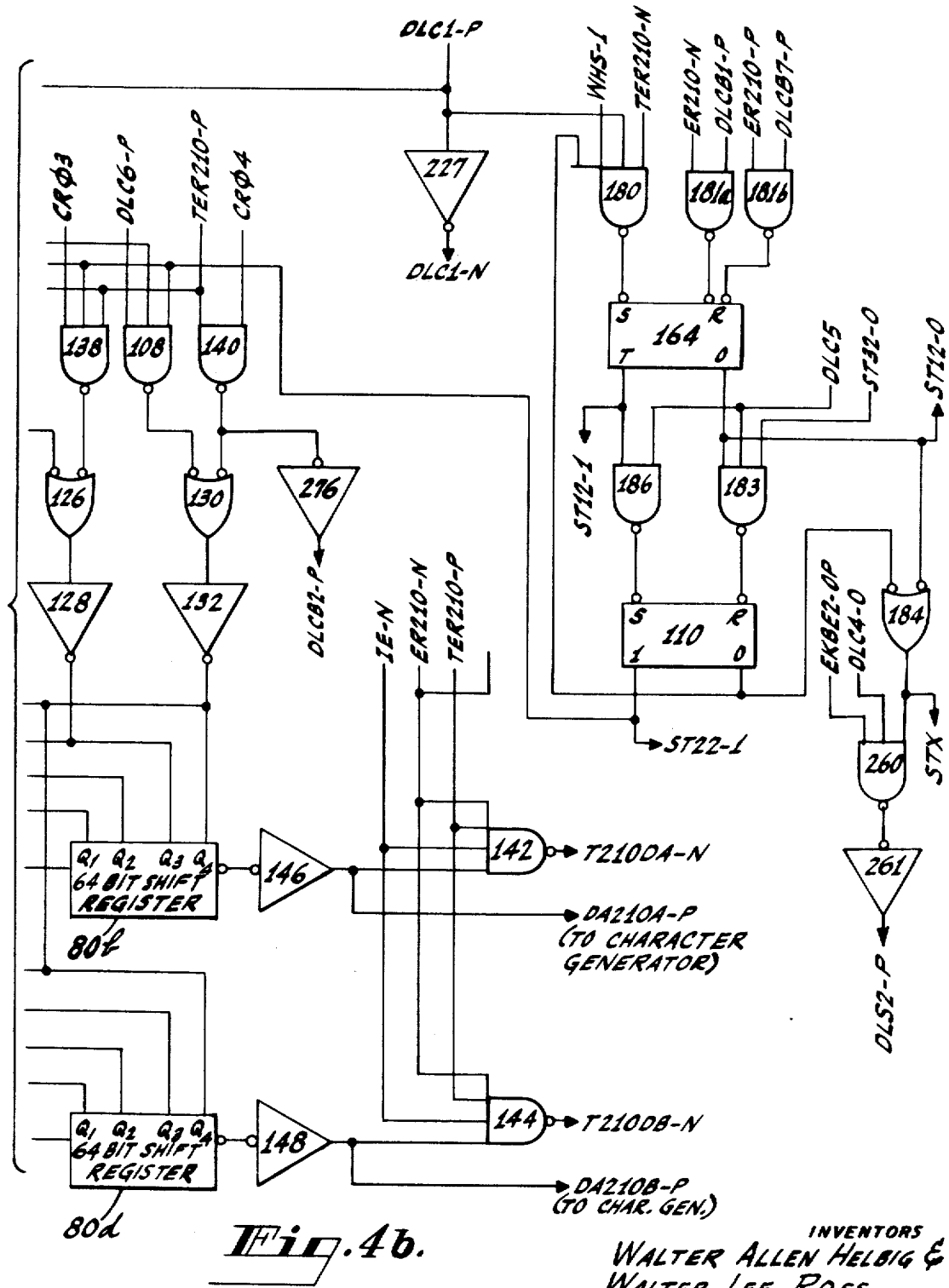

The information present in register 75 is transferred two bits at a time to a 256 bit shift register shown as four stages 80a-80d in FIGS. 4a and 4b. Each of the stages stores 64 bits and the two stages 80a and 80b act as half of the shift register and the two stages 80c and 80d, as the other half of the shift register. The operation of this shift register will be discussed shortly.

For reasons which will become clear shortly, it is necessary to determine which two of the three stages of shift register 75 (FIG. 3) will be sampled. It is possible to read out B12-1 and B22-1 (from stages 70 and 70a) or B22-1 and B32-1 (from stages 70a and 70b). The stages which are selected will depend upon the condition of flip-flop 82 and the reason that one pair or the other of the outputs of register 75 is selected is to insure that they are placed in the correct stages of the shift register 80, that is the odd or the even stages, as will be discussed shortly.

The return of signals to the memory begins exactly with a horizontal synchronization pulse by the signal WHS-1 setting flip-flop 164 in FIG. 4b. At this time, the previous Bell code resides in registers 150 and 152 (FIG. 5) and the row of characters is in register 80. One of the functions of the flip-flop 82, known as the bit alternator flip-flop, is to alternately steer the bits from registers 150 and 152 (FIG. 5) into the delay line. This alternation begins as soon as flip-flop 164 sets and continues until the end of the read operation, i.e., when HK1 is generated. Register 80a (FIG. 4a) always must receive the leading bit and all odd numbered bits of each block. By testing the condition of the bit alternator when the first two bits of a new block show up in the registers 70 and 70a, the decision is made either to immediately start entering the data into the shift register 80 or wait one more bit time to insure that the leading bit goes into register section 80a. Flip-flop 72a remembers this decision. Flip-flop 72 is always set immediately after the time for the above decision and means that the read operation has started.

In general, flip-flop 164 (FIG. 4b) defines the write period. It is set to begin the write operation by a horizontal synchronization pulse and is reset normally (ER210-N) when one of the memories such as A of FIG. 11 is circulating. This is a time when it is certain that all the data has been written to the delay line. Flip-flop 164 being reset is one condition required by gate 158 for recognition of the Bell code. This is so that it is unnecessary to look for Bell codes during writing. When HK-2 is generated, flip-flop 72 is reset, which primes gate 183 to reset flip-flop 110. This flip-flop is also a condition for recognition of the Bell code when it is set. When flip-flop 110 resets, the logic is all cleaned up ready for the next cycle which will begin after circulation. Only one HK-2 pulse is generated per cycle.

If it is assumed for the present that the input STX to AND gate 84 normally represents a 1, then each time DLC3=1 occurs, the flip-flop 82 will change its state. As may be seen from FIG. 7, DLC3 is an 0.08275 microsecond pulse and it occurs each 1.241 microseconds, that is, once each bit time.

Assume now that the initial bits of a row have been received from the delay line, have been successively placed in the data bit flip-flop 68 and have been successively shifted into the three-bit register 75. Assuming that the first two bits received are both 1, after two-bit times, this 1 is present in stages 70 and 70a of register 75. Assume now that DLC1-P represents a 1 and that ST12-1 also represents a 1. These two signals are two of the six inputs to AND gate 86. Assume also that flip-flops 72 and 72a are in a reset condition and flip-flop 82 is in a reset condition. (It will be shown shortly that the former assumption is valid as, when the previous Bell code was sensed, HK2 changed to 1 and acted as a reset signal for flip-flops 72 and 72a. However, DLC3 may set or reset flip-flop 82.) As B12-1 and B22-1 both are 1, six inputs to AND gate 86 represent ones so that flip-flop 72a becomes set.

At this point, a brief discussion is in order of the way in which the signal HK2 is generated. A more detailed discussion will be given later in connection with FIG. 5. The signal HK2=1 is produced by circuits 158, 160, 161 (lower right of FIG. 5) when the Bell code is stored in the registers 150-152 (FIG. 5). At this time, the data corresponding to the row of characters identified by the Bell code is located entirely in the shift register 80 (FIG. 4) so that the HK2 signal may reset the flip-flops 82, 72, 72a, etc., without causing any data to be lost. However, when the data stored in the register 150-152 and in the register 80 starts flowing back into the memory, HK2 changes to 0 and this removes the reset signal from the flip-flops. HK2 in other words, is a pulse of Bell code. (HK stands for HOUSEKEEPING and is intended to clean up the logic after an operation.)

Returning now to the previous discussion, it was stated that as B12-1 and B22-1 both were 1, flip-flop 72a (FIG. 3) became set. It may also be assumed that DLC2-P and ESTS-2 both represent 1 so that AND gate 88 is enabled and flip-flop 72 becomes set. When flip-flop 72 becomes set, ST32-0 changes its value to 0 and this disables the input AND gate 86 to flip-flop 72a. Thereafter, for the remaining time during which the row of characters following the Bell code will be read out of the memory, flip-flop 72a will remain set. The 1 output CON22-1 of this flip-flop serves as a priming signal to AND gates 90 and 92 in FIG. 4a. On the other hand, the 0 output present at CON22-0 disables AND gates 94 and 96.

Assume now that during the second bit time when stages 70 and 70a are both storing a 1, flip-flop 82 is set. In this case, the BA2-0 signal represents a 0 so that AND gate 86 is disabled. However, the 1's present at B22-1 and at B12-1 enable AND gate 88 and this sets flip-flop 72. The set flip-flop disables AND gate 86 so that it is no longer possible to set the flip-flop 72 during the following bit times when flip-flop 82 again becomes reset. Now AND gates 90 and 92 of FIG. 4a are disabled, whereas AND gates 96 and 94 are primed. As will be shown shortly, under this set of circumstances, the two bits B22–1 and B32–1 are read from the three-bit register 75 into the 256 bit shift register 80 beginning at the third bit time, whereas if the flip-flop 72a is set, the bits B12–1 and B22–1 are read into the shift register 80 beginning at the second bit time.

The shifting of information into the shift register 80 is controlled by the bit alternator flip-flop 82 of FIG. 3. Each time the bit alternator flip-flop 82 is reset, BA2–1 the input signal to inverter 100 of FIG. 4a represents a 0, and the inverter applies a priming signal to AND gates 102, 104, 106 and 108 of FIGS. 4a and 4b. The second input to these AND gates is the output ST22–1 of flip-flop 110. It may be assumed for the present that this flip-flop is set. If the information in stages 70 and 70a is being read out of the register 75 because flip-flop 72a was set earlier, this information is present at the input to the shift register 80 when the bit alternator flip-flop 82 is reset. On the other hand, if during the period stages 70 and 70a are being sensed the flip-flop 82 is set, the information will not begin shifting into the shift register 80 until the following DLC3 pulse when flip-flop 82 becomes reset. This means, therefore, that data is taken from the flip-flops 70 and 70a only every other bit time and causes the odd numbered bits (B22–1) to go into SR 80a and the even numbered bits (B12–1) to go into 80c.

If on the other hand the information in stages 70a and 70b of register 75 is being applied to the input terminals of shift register 80 because flip-flop 72a was not set earlier (CON22–0 represents a 1), then when BA2–1 becomes 0 and the data is shifted into the shift register 80, the odd numbered bits (B32–1) of the bit stream are at the input to shift register 80a and the even numbered bits (B22–1) are at the input to shift register 80c.

Referring now to FIGS. 4a and 4b, assume that CON22–1 represents a 1, priming AND gates 90 and 92. The signal TER210–N occurs each time data is supposed to be coming out of the memory and it defines the circulation time for memory. TER210–N blocks the input to the shift register during circulation. Each time TER210–N=1 occurs, a second priming signal is applied to AND gates 90 and 92. If during this time the bit B12–1 represents a 1, AND gate 92 becomes enabled and this enables OR gate 22 and OR gate 22 applies a positive pulse to inverter 112. The inverter, in turn, applies a negative pulse representing a 1 to shift register 80c.

If during the same period, that is, the period during which TER210–N represents a 1, the bit B22–1 represents a 1, AND gate 90 becomes enabled and this enables OR gate 114. The OR gate causes inverter 116 to apply a negative-going pulse representing a 1 to shift register 80a. Thus two of the bits present in the register 75 of FIG. 3 are applied in parallel to the shift reigster 80a, 80c.

If flip-flop 72a of FIG. 3 is reset rather than set, its output CON22–0 primes AND gates 96 and 94. In this event, the output B22–1 and B32–1 of register 75 are applied in parallel to the inputs to shift registers 80a and 80c, respectively.

The two-bit in parallel information applied to the shift register is shifted through the register by trigger pulses derived from the output BA2–1 of the bit alternator flip-flop 82 of FIG. 3. Each time this bit represents a 0, (it does this for about 1.25 microseconds each 2.5 microseconds, that is, once each two bit times), inverter 100 applies a priming signal to AND gate 102 (FIG. 4a). During each 1.25 microsecond period this AND gate is primed, the control pulse DLC2 (see FIG. 7) occurs once. The third input to AND gate 102, namely input ST22–1P also represents a 1 so that AND gate 102 is enabled. The output of this AND gate is applied through OR gate 118 and inverter 120 to the trigger terminals φ1 of the shift register, causing the information in the shift register to shift one stage forward. This shift pulse occurs once each two bit times.

As already mentioned, the shift register 80a–80d is a commercially available unit, each block consisting of 64 stages made up of metal oxide semiconductor (MOS) devices. These units are manufactured by General Instruments Corp. and may be identified by the part number MEM 3064. The information present in the shift registers may be shifted from stage to stage by a four-phase clock signal applied to the four trigger terminals of the register legended φ1, φ2, φ3 and φ4, respectively.

It has been shown already how the "low speed" phase 1 shift pulses are derived from the timing pulse DLC2 and the output BA2–1 of the bit alternator flip-flop. The successive phases of shift pulses are derived from the timing pulses DLC7, DLC1, and DLC6. The phase 2 pulses, for example, are obtained with AND gate 104, OR gate 122 and inverter 124. The phase 3 pulses are obtained with AND gate 106, OR gate 126 and inverter 128. The phase 4 shift pulses are obtained with AND gate 108, OR gate 130 and inverter 132. Each such shift pulse occurs once each two bit times.

The shifting of information into the shift register 80 continues for somewhat more than 5 scan line periods. By that time the shift register should be full, that is, it should be loaded with 32 characters. Now there is a pause as shown in FIG. 2 for approximately a half a scan line interval. This pause, during which no new information is shifted into the shift register 80 and no shift pulses are applied to the shift register 80 is obtained in the following way.

As information is being shifted into the shift register 80, the old information is being shifted from the shift register and back into the delay line. This old information, (DA210A–P and DA210B–P) is applied to the two registers 150 and 152 (FIG. 5). Register 150 consists of four stages 150a–150d and register 152 consists of four stages 152a–152d. Each pair of input bits is shifted through the registers 150 and 152 by the shift pulses produced by AND gate 154 and inverter 156. One such shift pulse is obtained each two bit times just as in the case of the multiple-phase shift pulses for register 80. Each shift pulse occurs during the time the output BA2–OP of flip-flop 82 (FIG. 3) primes AND gate 154. During these periods ST22–1P, the output of flip-flop 110 (FIG. 4b) is a 1 and, for a short interval within this period, the pulse DLC2–P becomes a 1 (see FIG. 7).

After all 32 of the old characters have been shifted out of the register 80, the next character is the Bell code, 00000111 which indicates that a new row of characters is present in shift register 80. This Bell code is now stored as DSR12–1P=1, DRS22–1P=1, DSR32–1P=1 and the remaining bits in registers 150–152 are all 0. This condition is detected by the Bell code decoder which consists of AND gate 158, OR gate 160 and inverter 161 (lower right of FIG. 5). Note that this gate receives four of the inputs above, namely DSR12–1P, DSR32–1P, DSR52–1N and DSR82–1N. The fifth input DSRD2–P is the one produced by the portion of the Cursor Code Decoder which consists of AND gate 162 followed by inverter 163 (left side of FIG. 5). The input to this portion of the decoder consists of the remaining four bits of the register, namely DSR72–1N, DSR62–1N, DSR42–1N and DSR22–1P. Thus, the output DSRD2–P of the decoder 162, 163 together with the remaining four DSR inputs to AND gate 158 define the storage of the code 00000111, which is the Bell code including the parity bit of this code.

At the time the Bell code is applied to AND gate 158, ST12–0P, one of the outputs of flip-flop 164 (FIG. 4b), represents a 1 and ST22–1P, an output of flip-flop 110 (FIG. 4b), also represents a 1. Accordingly, the decoder 158, 160, 161 produces an output HK2–N, representing a 1.

The signal HK2-N above is applied as a reset signal to flip-flop 82 and the reset flip-flop 82 applies a signal BA2-1P to inverter 100 of FIG. 4a in a polarity to disable the AND gates 102, 104, 106 and 108. Accordingly, the slow speed shift pulses are no longer produced and the 32 data words stored in the shift register 80 remain there for the "pause" of roughly ½ of a horizontal scan line interval, as mentioned above.

At the same time that the above is occurring, the BA-0P output of the reset flip-flop 82 of FIG. 2 disables the shift AND gate 154 of the registers 150, 152 (FIG. 5). Therefore, the Bell code for the 32 characters stored in register 80 cannot be shifted out of registers 150 and 152 and remains stored in these registers.

Following the pause, the control signal TER210-P (FIG. 8) is generated by stages 221 and 223 or 222 and 223 (FIG. 5) in response to the control signals LQ2 and LQ1. Note that AND gate 221 produces an output when LQ2-0N and LQ2-1N are both positive-going, that is, they both represent binary 0 and gate 222 produces an output when signals LQ2-1N and LQ1-0N are both positive-going, that is, they both represent a 0. In other words, the gates 221 and 222 implement the EXCLUSIVE OR function for the signals LQ1-1N and LQ2-1N. The LQ signals are produced in the master timing generator in the control area of the system.

As will be shown shortly, the purpose of signal TER210-N produced by inverter 225 (FIG. 5) is to signal the memory system that it is indeed time to start the transfer of data from the register 80 and the registers 150 and 152 back into the delay line and that it is time to prepare to receive data from the delay line. The signal TER210-N goes negative each time the signal TER210-P is positive.

When the signal TER210-P is generated, this primes AND gates 134, 136, 138 and 140 (FIGS. 4a and 4b). At the same time ST22-1P represents a 0 so that AND gates 102, 104, 106 and 108 (FIG. 4) are disabled. The pulses CRφ1 through CRφ4 are multiple-phase high-frequency shift pulses which are generated during an approximately 42.3 microsecond period starting roughly 8 microseconds after the start of TER210-P (see FIG. 8). Exactly 128 sets of 4 shift pulses (128 in each phase) are generated and when these shift pulses are applied to the shift register they shift the information stored therein at a rate of 6.041958/2 megahertz, that is, 6.041958/2 bits per second. Since the respective halves 80a–80b and 80c–80d of the register are effectively in parallel, the effective bit rate is 6.041958 megahertz so that it is possible to shift all of the information through the shift register in 42.3 microseconds, a period within the 63.5 microsecond scan line interval.

When TER210-P has the value 1 (is relatively positive), the output AND gates 142 and 144 (FIG. 4b) of the register 80 are primed. The other inputs to these AND gates, ER210-N and IE-N, may also be assumed to represent the 1 bit during this period. Therefore, the information present in the registers is applied through inverters 146 and 148 and AND gates 142 and 144 to the input OR gates 114 and 22, respectively, of the registers. This information therefore circulates around the register once.

During the time the row of information is being circulated at high speed around the register, this same information is supplied to the shift registers SR and the character generators of FIG. 1. The thirty-two characters for the row of information subsequently are shifted through the successive character generators in 13 television scan lines to cause this information to be converted to video information and to be displayed on the television screen, as already discussed.

Figure 7:
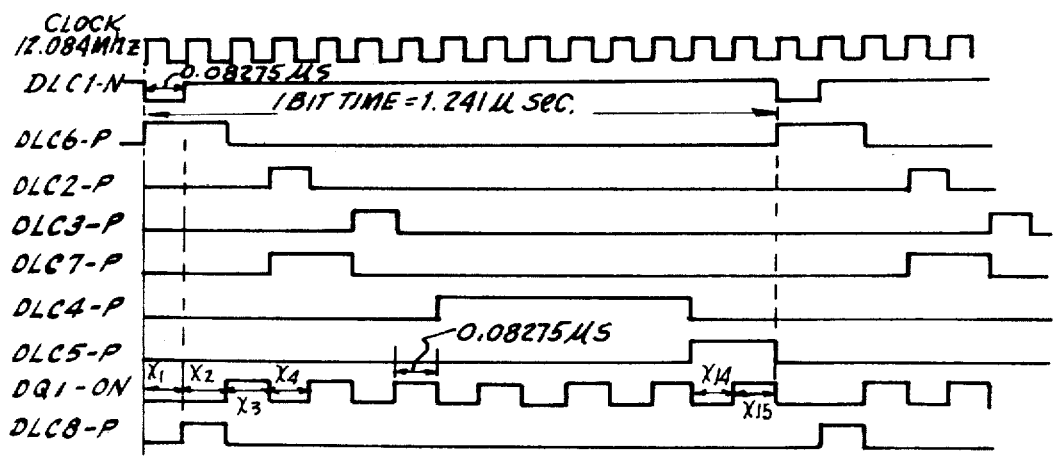
FIGS. 7 and 8 are drawings of waveforms to help explain the operation of other of the circuits of the preceding figures.
Figure 8:
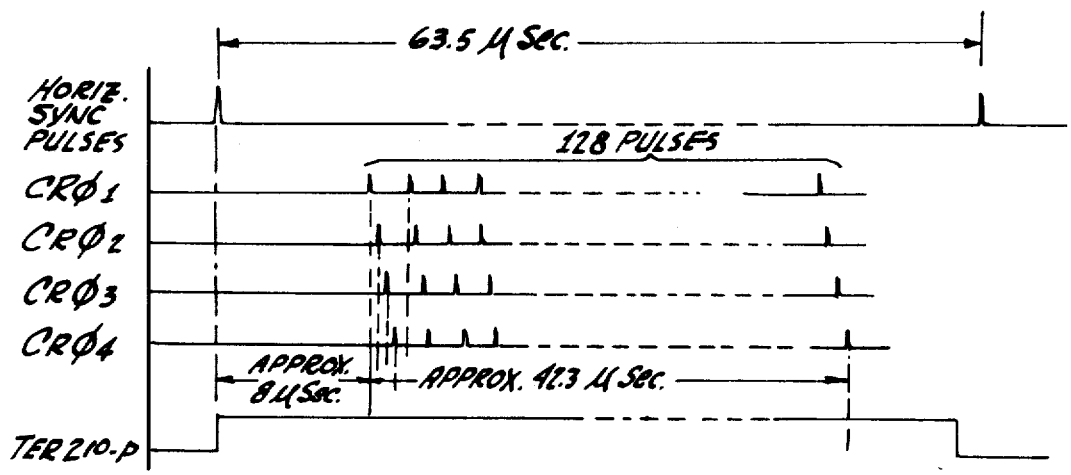

After the horizontal scan line period above, during which the information present in the shift register 80 (FIG. 4) is circulated once through the shift register, the signals TER210-N and WHS-1 go positive. The way in which signal T0R210-N is generated has already been discussed and its complementary signal TER210-P is shown in FIG. 8. The signal WHS-1 occurs once each row, at the end of the first horizontal scan line of that row. These two signals prime AND gate 180 (upper right of FIG. 4b). Now, when the timing pulse DLC1-P occurs (this is a pulse that goes positive once each bit time and its complement DLC1-N produced by inverter 227 is shown in FIG. 7) AND gate 180 becomes enabled and flip-flop 164 becomes set. This causes ST12-0 to change its value to 0 and the AND gate 158 (FIG. 5) of the Bell code decoder becomes disabled.

When flip-flop 164 becomes set, the output ST12-0 goes relatively negative so that OR gate 184 produces an output STX=1. This serves as a priming signal for AND gate 84 of FIG. 3. Thereafter, each time the pulse DLC3 occurs, AND gate 84 becomes enabled and flip-flop 82 changes its state.

The output BA2-1 of flip-flop 82 now changes its value once each bit time and, as ST22-1P represents a 1, the AND gates 102, 104, 106 and 108 again begin producing the relatively slow speed multiple-phase shift pulses which are applied to the shift register 80. (Note that ST22-1 changes to 1 shortly after flip-flop 164 becomes set. This occurs because the set flip-flop 164 primes AND gate 186 and the pulse DLC5 shortly thereafter enables this AND gate and causes it to set flip-flop 110.) The two-bits-in-parallel information shifted out of the shift register 80 flows through inverters 146 and 148 to the parallel shift registers 150 and 152, respectively of FIG. 5. The two-bits-in-parallel are shifted through these two registers by the output of AND gate 154 and inverter 156 in the same way that the Bell code was shifted into this register, as already described. In brief, every two bit times, BA2-0P changes to 1 and as ST22-1P is also a 1, AND gate 154 is enabled each time DLC2-P changes to 1 (see FIG. 7).

The two-bits-in-parallel output of shift registers 150 and 152 are converted to serial form by the two AND gates 190 and 188, respectively. During one bit time, BA2-1P is a 1 priming AND gate 190 and during the immediately following bit time BA2-0P is a 1 priming AND gate 188. During a restricted interval (0.08275 microsecond) within each bit time, the pulse DLS2=1 occurs, enabling the one of AND gates 190 and 188 which happens to be primed. This enabled AND gate applies the information present in the last stage of its register (either stage 152d or stage 150d) through OR gate 192 to the write circuits 36 (FIG. 1) at the input to the delay line memory 24. This information is legended DL2I-P in FIG. 5.

When the writing of data is completed, the signals ER210-N and DLCB1-P (upper right of FIG. 4b) go positive and AND gate 181a thereupon resets flip-flop 164. During the erase operation, the flip-flop 164 will be reset via gate 181b. The reset pulses DLCB1-P and DLCB7-P are produced at other portions (not shown) of the complete system but at a place corresponding to that at which the analogous signal DLCB2-P is generated by inverter 276 (right center of FIG. 4b). The DLCB1-P and DLCB7-P signals are chosen because they happen to occur at the right time to perform the reset function, that is, approximately 5⅙ television scan lines after the flip-flop 164 is set. Flip-flop 110 subsequently is reset when the Bell code is detected as being stored in the registers 150, 152 (FIG. 5). At this time, the signal HK2-N goes negative and this resets stage 72 (FIG. 3) changing ST32-0 to a 1. Now when DLC5-P changes to 1, AND gate 183 is enabled an it resets flip-flop 110.

In the earlier part of the present discussion, it was explained at length how a delay of one bit period can be achieved in the read out of the three-bit register 75 of FIG. 3. However, the reason for doing this was not discussed and this will be covered here.

Assume first that the data bits arriving from the delay line are identified as A B C D E and so on and that they arrive in this sequence, that is, first the A bit, second the B bit and so on. These bits pass into the register 75 and then into the register 80 (FIGS. 4 and 5) and then into the registers 150 and 152 (FIG. 5). If the stages 70 and 70a are selected, the bit in stage 70a, that is, B22–1 will eventually be stored in stage 150d of the register 152 as bit DSR–12 and the bit B12–1 will be stored in stage 150d of register 150 as bit DSR22–1P. If the stages 70a and 70b are selected, the bit B32–1 will be stored in the last stage of register 152 as DSR–12 and the bit B22–1 will be stored in the last stage of register 150 as bit DSR22–1P.

If there were no control, any one of the following four conditions could occur in the process of shifting the information from register 75 through the registers 80 and through the registers 150 and 152.

(I) The first bit A could arrive at the second stage 70a at register 75 when the other shift registers 80, 150 and 152 were not being shifted. At the next clock phase, the data bits B12–1 and B22–1 would be shifted into the shift registers 80c and 80a respectively. In due course, these bits and the ones following them would reach the end of registers 150 and 152 and would be stored as:

DSR–12=A
DSR–22=B
DSR–32=C
DSR–42=D (II) The first bit A could arrive at the first stage 70 of the register 75 at a clock phase when the other shift registers were not being shifted. In the next clock phase, the data from the first two stages 70a and 70 would be shifted into the other shift registers. When the data finally arrived at the end of registers 150 and 152, the bits stored would be:

DSR–12=zero
DSR–22=A
DSR–32=B
DSR–42=C
DSR–52=D (III) The same thing could occur as discussed under example I above with the two bits being taken from the last two stages 70a and 70b of register 75. The final result in this case would be:

DSR–12=zero
DSR–22=A
DSR–32=B
DSR–42=C
DSR–52=D (IV) The same condition as II could occur with the two bits being taken from the last two stages of the three-bit shift register. In this case, the final result would be:

DSR–12=A
DSR–22=B
DSR–32=C
DSR–42=D

If a decoder were connected to the registers 150 and 152 to recognize when the bits A and B arrived at the last stages 152d and 150d of registers 152 and 150, the storage states depicted under Examples II and III would not be recognized. Further, it is clear that these two Examples II and III represent improper system operation since the final stage of register 152, rather than storing an information bit, is storing nothing, that is, while a bit should be present in stage 152d, it is not.

Flip-flops 72 and 72a prevent the improper operation depicted in Examples II and III from occurring. They select automatically the two of the three stages of register 75 which are actually storing bits and once a selection is made, the remaining bits of the block of data must be read out properly. The selection is made at the beginning of each block of data so that each row of characters is properly synchronized with the sweep of the television display.

In the discussion of FIG. 3, the signals ER210 applied to gates 10 and 50 are mentioned. This signal is an erase signal that prevents the data output of memory from passing through gate 10 to the shift register 500. The gate 10 is disabled when the signal ER210–N is negative. This signal goes negative when either flip-flop 201 or 202 (lower part of FIG. 5) is set at the time data for one of the two displays associated with the delay line memory is to be read from the memory. Note, for example, that when flip-flop 201 is set and the signal LQ2–0N represents a 1, AND gate 230 is enabled and this enables OR gate 231 so that inverter 232 produces a negative-going signal ER210–N. In a similar manner, if flip-flop 202 is set and the control signal LQ2–1N is relatively positive, AND gate 233 is enabled and the signal ER210–N goes negative.

The flip-flops 201 or 202 may be set for a period extending from some row of characters to the bottom of the page being displayed or for a period equivalent to that of a full page. The signal E–P applied to prime the input AND gates 204 and 206 of flip-flops 201 and 202, respectively, is derived in the control area of the system. Note that when AND gate 221 is enabled, inverter 234 applies a positive-going signal to AND gate 204 and when AND gate 22 is enabled, inverter 235 applies a positive-going signal to AND gate 206.

When the signal ER210–N becomes relatively negative, a number of different things occur. The signal is applied to gates 142 and 144 (FIG. 4b) at the output of the shift register 80 and this prevents this information from being reinserted into the register 80. The signal ER210–N also disables AND gate 10 at the upper left of FIG. 3. This is the AND gate through which the bits stored in the delay line pass when they are placed in the register 500. If AND gate 10 is disabled and AND gate 50 is also disabled, each time the shift pulse DQ–1 occurs, a 0 is placed in the register 500 and if these gates are maintained disabled for a sufficient period as many rows of stored information as desired can be erased.

It is also possible for gate 50 to be enabled when gate 10 is disabled (FIG. 3). This permits new information to be inserted into the register 500 and subsequently into the delay line memory through the input gate 50. At the beginning of each write cycle, for example, flip-flop 164 (FIG. 4b) is set so that the input ST12–1 to gate 50 is a 1. Flip-flop 72 is reset so ST32–0 is a 1. Therefore, in response to the successive shift pulses DQ–1, a succession of 1's are supplied to the register 500, when three 1's fill up the shift registers 70, 70a, 70b, flip-flop 72 becomes set so that ST32–0 goes negative (represents a 0) and AND gate 50 is disabled. Thereafter, zeros are shifted into register 500. The three 1's in registers 70, 70a, 70b followed by zeros in the Bell code and it is subsequently shifted through the register 80 and into the registers 150, 152. There the Bell code is recognized (circuits 158, 160, 161) and is used to stop the cycle just as in the normal write operation. Thus, any possible loss in synchronization automatically is prevented by the insertion of this code whenever erasure takes place.

The above process repeats until the signal R17–P, which corresponds to what would be the seventeenth row of characters, is generated. The signal is applied to AND gates 250 and 251 causing these gates to reset the flip-flops 201 and 202 and in this way to terminate the erase cycle.

The output of AND gate 251 also serves as a set signal for flip-flop 252. The output of this flip-flop DLB2–0P serves as a disabling input to AND gate 10, upper left of FIG. 3. The purpose of this signal is to block the output of the delay line during the vertical retrace interval. Upon termination of the vertical retrace interval, the signal B0P–P is generated which enables AND gate 253 and the latter resets flip-flop 252.

Whenever desired, computer originated data may be placed in the delay line memory and this is done via the gates 274 and 275 of FIG. 4a.

Gates 260 and 261 of FIG. 4b generate the strobe signals DLS2–P to transfer data from the registers 150, 152 (FIG. 5) into the delay line. These pulses occur when data is being rewritten and are inhibited when the keyboard data is replacing one of the Cursor Codes in the memory. The signals DLS2–P go to the gates 188 and 190 of FIG. 5. DLC4–0N applied to gate 260 of FIG. 4b is the strobe pulse used to produce this signal and it is also applied to gate 270 (FIG. 5) as the keyboard data entry strobe. (Gate 270 and the other gates associated with it are discussed in more detail later.)

KEYBOARD DATA INSERTION CIRCUITS

In the use of the system of the present invention for instructional purposes, it is sometimes desirable for the student to insert data into the display. For example, in the case in which the material being displayed is a lesson plan, there may be questions at the end of the lesson which the student must answer. He answers these questions by depressing keys on the keyboard within block 38 of FIG. 1 and this causes these characters both to be displayed and sent back to the computer within block 38 of FIG. 1.

In those places in which it is desired that the student enter data, the television receiver displays a special so-called "Cursor Code" symbol. This symbol is stored in the delay line as binary octal 22, that is 10 010 010, where the left-most 1 is the parity bit.

If a Cursor Code is present in a row of characters, when that row is shifted out of the shift register 80, it passes through shift registers 150 and 152. The Cursor Code, when present in registers 150 and 152 is sensed by the Cursor Code decoder which consists of AND gate 162, inverter 163 and AND gate 200, all in FIG. 5. The additional signal KBDR–P applied to decoder gate 200 indicates that a character has been received from the keyboard. If this signal represents a 1 and if BC02–P, discussed later, also is a 1 at the time the Cursor Code is present in the registers 150, 152, when flip-flop 240 becomes set, AND gate 241 becomes enabled and KBR2–N goes negative. KBR2–N is the signal sent to the keyboard data receiver to indicate that data is being entered into the terminal member and should be removed from its memory register. The data from the keyboard (character code) is then brought into the logic states of the present system and inserted in place of the Cursor Code. BC02–P then resets flip-flop 240, the next time DLC1–P occurs, by means of AND gate 242. This occurs one character time after flip-flop 240 is set because DLC1–P occurs in a bit time before DLC3–P, the strobe on the set signal for flip-flop 240.

In a single delay line there is data for two student terminals. Therefore, there are also Cursor Codes for both terminals. In the present system the data received from the terminal keyboard goes into the first data locations from the top of the page for that terminal where a Cursor Code is presently stored in it. More than one Cursor Code may be in a terminal's memory at one time.

Gates 262, 263 and 264 of FIG. 5 separate the search for the first Cursor Code for the two terminals so that data for one of the terminals goes into its area of the delay line memory and data for the other terminal goes into the other area of the delay line memory.

When flip-flop 240 of FIG. 5 is set, the keyboard data entry is enabled through gate 270, as EKBE2–1P has the value 1. DDR1 is the character code data signal that is to be entered. It goes into the memory serially via gates 268, 269 and 270.

In the present system, there are two modes of operation. In one, each character code has a parity bit and each code is checked by the parity circuit (not shown explicitly). If bad parity exists, a solid rectangle is generated in place of the character defined by the character code. In the other mode, the parity bit is replaced by an underline bit. This bit, when a one, causes the character generator to draw a line under the character specified. ULM–P, one of the inputs to gate 265, is the control signal specifying which mode the system is in. When in the parity bit mode, this signal is a zero and therefore all bits of the character code DDR1–1P go into the memory. When in the underline mode, ULM–P is a one and at BC02–P (the bit time for the parity bit to be going into the memory) the output of gate 265 inhibits gate 268 and through inveretr 266 enables gate 267 to enter the underline data, DSR22–1P, into the memory via gates 267, 269 and 270.

As the actual circuits for inserting characters from a keyboard into delay line memory are in themselves known and not part of the invention being claimed, they need not be described in detail here. Typical circuits of this typ are shown, for example, in Durr Pat. No. 3,307,156, dated Feb. 28, 1967.

The circuit for producing the BC02–P signal discussed above is shown in FIG. 3. It is merely a three-stage counter comprising flip-flops 82, 210 and 212 followed by a recognition gate 245 and inverter 246. The signal BC02–P is produced each time eight successive pulses are counted. The signal BC02–P may be considered a character sysnchronization pulse and it indicates when the bits in the shift registers 150, 152 may be examined to see if a Cursor Code happens to be present. If these registers 150, 152 were sensed at any other time, an erroneous signal might be obtained from the end bits of one character code and the beginning bits of the next character code in sequence.

Another feature of the present system is its ability to receive and recognize the data from the terminal keyboard. Since the actual time a student will depress a key is unpredictable, some correlation of signals must be accomplished. In the present system the data is sent from the keyboard at the first vertical retrace time following the depressing of the key and is timed by sending one data bit each television horizontal line time. The signal ESTS2 defines the conditions for setting flip-flop 72 via gate 271 for normal case and via gate 272 for the erase case (see lower right of FIG. 5). Flip-flop 240 (lower left of FIG. 5) enables generation of shift pulses to the keyboard buffer (not shown). The latter is loaded by horizontal synchronization pulses but is unloaded at the delay line bit rate.

What is claimed is:

1. In combination:
   a plurality of display means, each including a screen, means for scanning the screen in raster fashion, and meas responsive to display signals which occur during the scanning for displaying said signals on said screen;
   a plurality of memories, each for a different display means, and each for storing character codes indicative of successive characters it is desired to display on its display means;
   a plurality of character generators, each for generating, in response to a character code, the display signals for one line of the row which will display that character, each such generator providing the signals for a different line;
   means for applying the character codes produced by said memories, in succession, to the successive character generators, for causing each character generator to provide successive groups of display signals, each group for the same line of a row of a different display means; and
   switching means for applying the successive groups of display signals produced by each character generator to the respective display means for which they are intended, during successive time intervals, whereby each display maens derives from the successive character generators, signals for the succeeding lines of a row on that display means.

2. The combination set forth in claim 1, further including means for applying the character bit codes produced by said memories to said character generators a group at a time with the groups from the respective memories interlaced, each said group containing a sufficient number of character codes for one entire line on one display means.

3. In the combination set forth in claim 1, each such memory comprising a delay line memory.

4. In the combination as set forth in claim 1, each said display means comprising a television receiver and each such memory comprising a delay line whose output signals are not necessarily synchronous with the scanning of said television receiver.

5. In the combination set forth in claim 1, each such memory including means for storing character codes for a plurality of said display means.

6. The combination set forth in claim 1, further including means responsive to the character codes stored in said memories for displaying on said display means two interlaced fields each display frame and further including means within each character genertaor responsive to the field of information to be displayed for altering, where necessary, the display signals it produces.

References Cited

UNITED STATES PATENTS

| | | |
|---|---|---|
| 3,307,156 | 2/1967 | Durr. |
| 3,400,377 | 9/1968 | Lee. |
| 3,438,001 | 4/1969 | Langtry et al. |
| 3,413,610 | 11/1968 | Botjer et al. |
| 3,426,344 | 2/1969 | Clark. |
| 3,453,384 | 7/1969 | Donner et al. |
| 3,497,613 | 2/1970 | Botjer et al. |
| 3,501,749 | 3/1970 | Cuccio. |

PAUL J. HENON, Primary Examiner

S. CHIRLIN, Assistant Examiner

U.S. Cl. X.R.

340—324